United States Patent [19]

Wason

[11] Patent Number: 4,654,836

[45] Date of Patent: Mar. 31, 1987

[54] SEISMIC VIBRATOR SOURCE HAVING IMPROVED PHASE DETECTOR

[75] Inventor: Cameron B. Wason, Plano, Tex.

[73] Assignee: Texas Instruments Incorporated, Dallas, Tex.

[21] Appl. No.: 435,125

[22] Filed: Oct. 18, 1982

[51] Int. Cl.⁴ .............................................. G01V 1/16
[52] U.S. Cl. ..................................... 367/190; 367/48;
324/83 FE; 181/114
[58] Field of Search ........................... 367/190, 48, 66;
181/114, 401; 364/421; 324/83 D, 83 FE

[56] References Cited

U.S. PATENT DOCUMENTS

| | | | |
|---|---|---|---|
| 3,881,167 | 4/1975 | Pelton et al. | 367/190 |
| 3,980,828 | 9/1976 | Orban | 381/63 |
| 3,984,805 | 10/1976 | Silverman | 367/190 |
| 4,068,210 | 1/1978 | Corkhill | 367/190 |
| 4,500,976 | 2/1985 | DuBroff | 367/190 |

Primary Examiner—Thomas H. Tarcza
Assistant Examiner—Ian J. Lobo
Attorney, Agent, or Firm—Thomas G. Devine; Leo N. Heiting; Melvin Sharp

[57] ABSTRACT

A vibrator seismic source has a hydraulic system, including a pad, for applying reciprocating forces to the ground and sensor means for generating a feedback signal representative of the force applied to the ground. Circuitry is provided for generating a pilot signal representative of the desired force to be applied to the ground. The pilot and feedback signals are single sideband shifted to increase both frequencies by a predetermined frequency. The high frequency pilot and feedback signals have their phase difference conventionally detected and provided to a digital computer for phase shifting the signal for controlling the vibrator so that the feedback signal is in phase with the pilot signal. In another embodiment, the instantaneous phase of each signal is computed continuously by a digital computer. The control signal digital representation is corrected to correspond with the pilot digital representation and an analog output signal is generated to provide the proper analog control signal.

14 Claims, 30 Drawing Figures

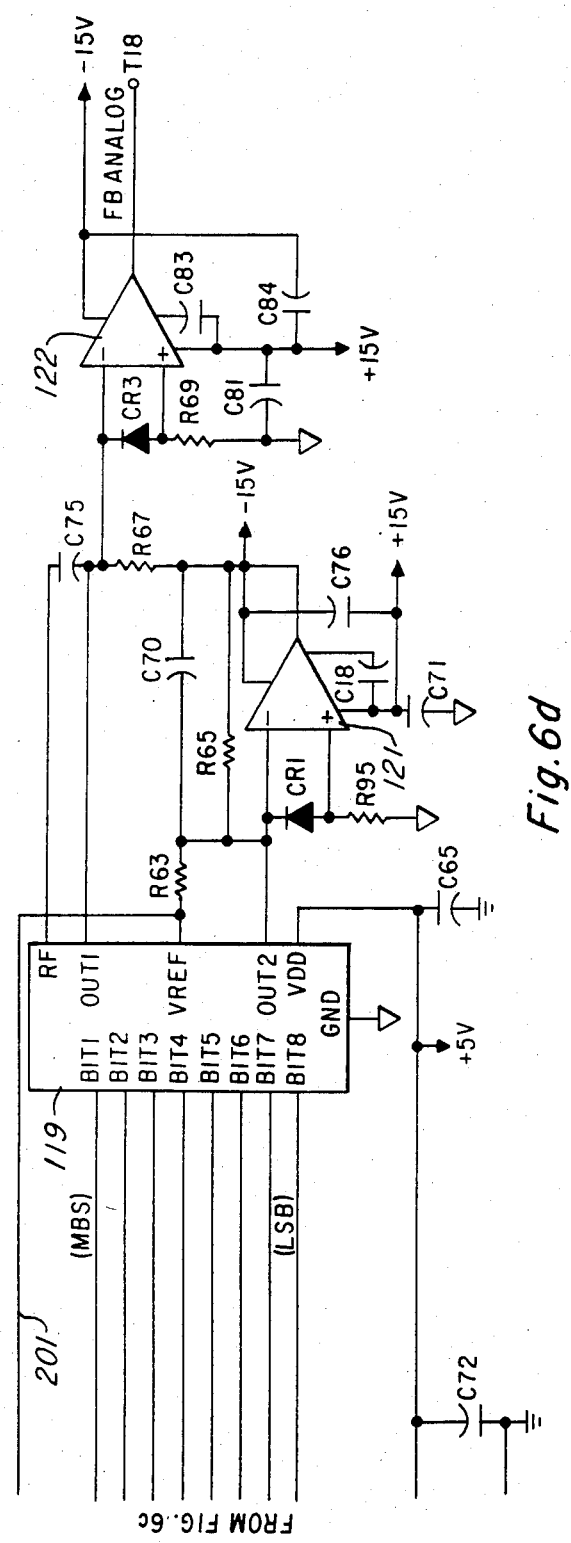

SEISMIC VIBRATOR SOURCE HAVING IMPROVED PHASE DETECTOR

BACKGROUND OF THE INVENTION

This invention deals with a semismic vibrator having phase detection circuitry and more particularly to seismic vibrators and circuitry for dramatically increasing the frequency of the signals whose phase difference is to be detected.

DESCRIPTION OF THE PRIOR ART

In the prior art, the phase detector measures the difference between a feedback signal and a pilot signal by measuring the time difference between the last two zero crossings of these two signals. The control system, therefore, is operating upon delayed information and this delay increases as the frequency being controlled decreases. Delay in a control loop places a limit upon the amount of control that can be exercised and in many circumstances will cause instability in the control system.

An instant invention, through a single sideband shifting technique, increases the frequency of both the feedback and pilot signals, providing an essentially continuous estimate of the phase difference.

BRIEF SUMMARY OF THE INVENTION

A seismic vibrator source employs a pair of accelerometers, one on the mass and the other on the pad of the hydraulic assembly portion of the vibrator, the outputs of the accelerometers being selectively combined to provide a feedback signal representative of the ground force. A sweep generator is provided for generating a pilot signal. If there is a phase difference between the feedback signal and the pilot signal, the signal controlling the hydraulic system must be phase adjusted to compensate for either a leading or lagging feedback signal as compared to the pilot signal. The feedback and pilot signals are single sideband shifted in an analog manner, in this preferred embodiment, to generate single sideband, high frequency feedback and pilot signals which are then conventionally detected in a zero crossing detector. However, with the greatly increased frequency, very many more samples are taken and therefore a much more accurate and essentially continuous representation of the phase difference is made.

In another embodiment, a pair of digital filters perform a 90 degree shift on each signal. A digital computer then calculates the respective phases and forms the phase difference.

The phase difference output is then applied, in a conventional manner, to adjust the phase of the control signal in accordance with the phase difference. The control signal then causes the drive signal to adjust phase accordingly.

The principle of this technique is illustrated in the following summary.

PRINCIPLE

The sensor signal s(t) and the pilot signal p(t) can always be represented in the following form:

$$s(t) = a(t) \cos A(t)$$

$$p(t) = b(t) \cos B(t)$$

The continuous phase difference function that is desired to control the hydraulic system is $$y(t) = B(t) - A(t)$$

In the preferred embodiment, an analog method based upon single sideband translation of the signals s(t) and p(t) followed by phase difference detection is implemented. In this implementation, the signals s(t) and p(t) are single sideband translated, using the circuit technique described herein, to a suitably high frequency. In this preferred embodiment, a frequency of 2 KHz is employed. After frequency translation, let the signals be represented by s'(t) and p'(t). Then $$s'(t) = a(t) \cos(W_o t + A(t))$$

$$p'(t) = b(t) \cos(W_o t + B(t))$$

where
$W_o = 2 \pi f_o$
$f_o$ = translation frequency

Conventional phase detection is then performed between the pilot signal and the sensor signal to produce the desired phase difference signal (B(t)−A(t)).

Another embodiment of the technique relies on the use of a microprocessor. In this method, the analog signals s(t) and p(t) are first converted to digital form and then the phases A(t) and B(t) are computed using an algorithm based upon the so-called "analytic signal."

Consider the example of the signal s(t). A digital filter is used in the microprocessor to compute the signal $\hat{s}(t)$ which is the 90 degree phase-shifted equivalent of s(t). This is called the Hilbert transform of s(t). For each time sample, the phase A(t) is computed as $$A(t) = \arctan(\hat{s}(t)/s(t))$$

A similar computation is done using p(t) to estimate B(t) and then the desired phase difference is computed.

A principal object of the invention is to reduce the time delay in the determination of the phase difference between the pilot signal and feedback signal of a seismic vibrator source.

Another object of the invention is to eliminate the dependency of the delay upon the frequency of the signals being phase compared.

Still another object of the invention is to provide an essentially continuous estimate of the phase difference.

A further object of the invention is to reduce the sensitivity of the measurement of the phase difference to the effects of noise that may exist.

These and other objects will be made evident in the detailed description that follows.

BRIEF DESCRIPTION OF THE DRAWINGS

FIGS. 6a–6d joined as shown illustrate another section of the single sideband shifting network.

DETAILED DESCRIPTION

Figure 1:
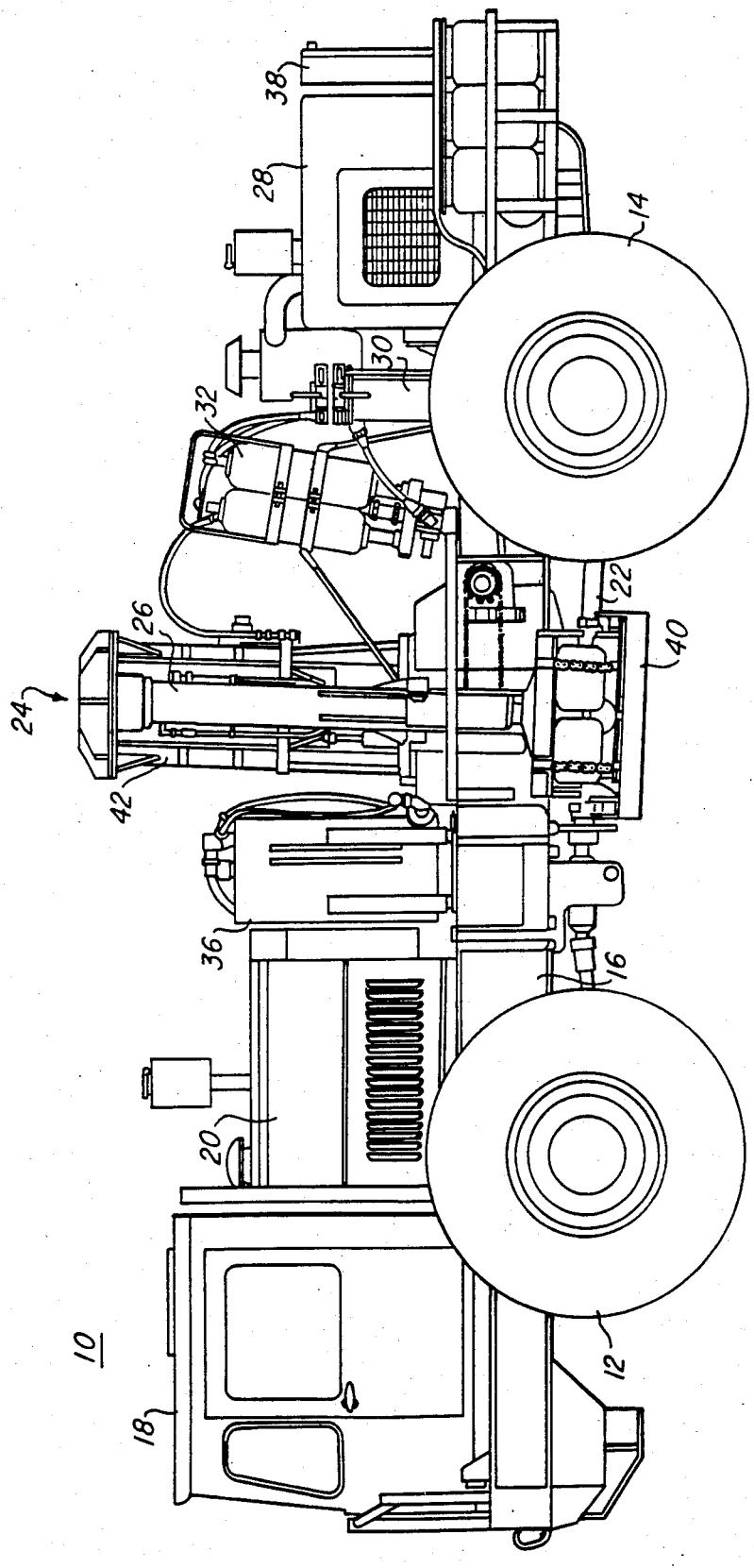
FIG. 1 is a side view of the seismic vibrator source mounted on a truck.

Referring first to FIG. 1, a vehicle 10 having front and rear wheels 12 and 14, respectively, supports a chassis comprised generally of frame channels 16, a cab 18, and a conventional engine 20. The feedback circuit of this invention is primarily located within cab 18 and is not shown in FIG. 1. Vibrator assembly 24 is disposed between the first and rear wheels and connected to the frame members 16 of the truck by a lift system 26. A prime mover or engine 28, main hydraulic pump 30, high pressure accumulator system 32, hydraulic fluid tank 36, hydraulic tank cooler 38 and associated hydraulic plumbing may be located on the frame members 16 as shown.

Figure 2:
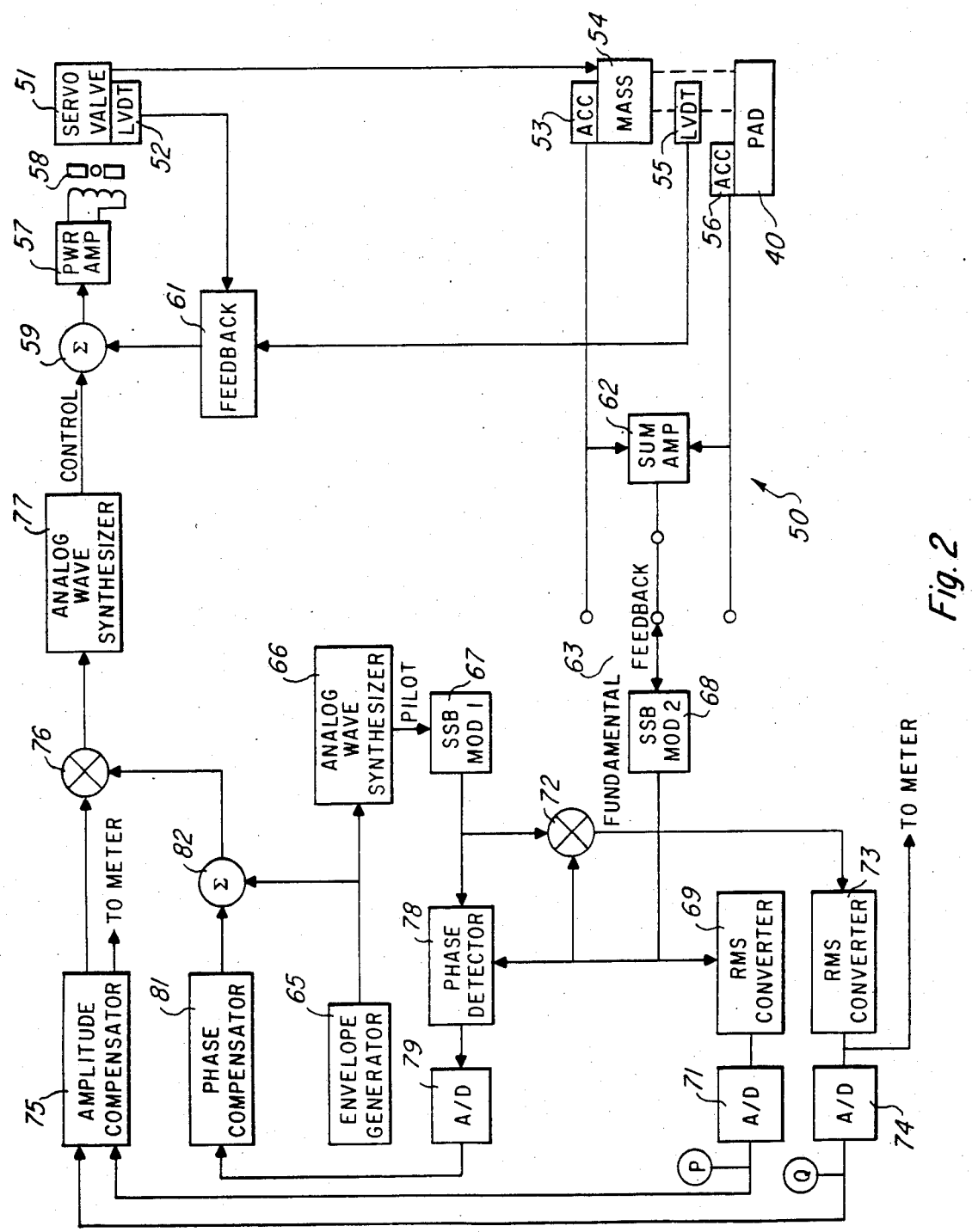
FIG. 2 is a block diagram of the feedback system.

FIG. 2 illustrates the combination of summer 59, power amplifier 57, servo valve motor 58, servo valve 51, mass 54, pad 40, linear variable-differential transducers 52 and 55, and feedback 61. This combination is in the prior art as described in U.S. Pat. No. 3,929,206, entitled "Servo Hydraulic Transducer and Method of Operation" assigned to the assignee of this invention and incorporated herein by reference. Accelerometers 53 and 56 are attached to the mass 54 and tab 40 respectively and are summed in conventional summing amplifier 62. Switch 63 enables the selection of the mass accelerometer output, the pad accelerometer output, or the addition of the two outputs. Any of these three signals then form the feedback signal which passes into single sideband (MOD 2) 68, the output of unit 68 being a single sideband signal increased by the frequency of a local oscillator, which in this preferred embodiment operates at 2 KHz. The output from unit 68 goes to multiplier 72 and to phase detector 78.

Amplitude compensator 75, phase compensator 81 and envelope generator 65 are modules within a TI 99000 microprocessor chip which, together with appropriate memory, forms a microcomputer. The envelope generator 65 provides digital words indicative of the contour of the desired amplitude envelope. Also provided by the computer is a digital work relating to instantaneous frequency. The output of the envelope generator 65 provides inputs to analog wave synthesizer 66. Analog wave synthesizer 66 is known in the prior art and is described in detail in U.S. Pat. No. 3,979,715, entitled "Method and System for Achieving Vibrator Phase Lock", assigned to the assignee of this invention and incorporated herein by reference. There it is shown that the analog wave synthesizer comprises a binary rate multiplier, binary counters, a read-only memory, and a D to A converter. The output of analog wave synthesizer 66 is the pilot signal which enters single sideband (MOD 1) 67 and is increased in frequency by 2 KHz, in this preferred embodiment. The output of unit 67 provides an input to phase detector 78 and an input to multiplier 72. The multiplication of the feedback single sideband signal by the squared single sideband pilot signal yields the fundamental signal. The fundamental signal is input to RMS converter 73 which provides a voltage level indicative of the RMS value of the input fundamental signal. RMS converter 73 and RMS converter 69, in this preferred embodiment, are type AD536ASD/883B, manufactured by Analog Devices. The output from RMS converter 73 is input to A/D converter 74 whose output goes to amplitude compensator 75. The output from RMS converter 73 also provides an input to a meter available for inspecting the RMS value of the fundamental signal. The output from unit 68 provides an input to RMS converter 69 whose output represents the RMS value of the feedback signal which is thn digitized through A/D converter 71 and input to amplitude compensator 75. Amplitude compensator 75 provides an input to multiplier 76 whose other input comes from envelope generator 65 through summer 82. Amplitude compensator 75, as will be shown, provides a digital output for altering the output of envelope generator 65 to provide an amplitude digital indicator representing the pilot signal modified by the amplitude of the fundamental signal and by the distortion. This digital information is presented to analog wave synthesizer 77 which is in the prior art and substantially identical to analog wave synthesizer 66 to provide a control signal through summer 59 to power amplifier 57 which provides a drive signal for driving the servo valve 51 to move the hydraulic unit, mass 54 and pad 40 so that the feedback signal is equal in amplitude to the pilot signal. This broad description is of the amplitude compensation and following is a broad description of the phase compensation.

Phase detector 78 having inputs from units 67 and 68 provides a phase difference output to phase compensator 81 through A to D converter 79. The output of phase compensator 81 is summed with a digital word indicative of an instantaneous frequency from envelope generator 65 at summer 82. This frequency change, if any, is reflected through the analog wave synthesizer 77 to provide the control signal for ultimately providing a feedback signal in phase with the pilot signal.

Figure 3:
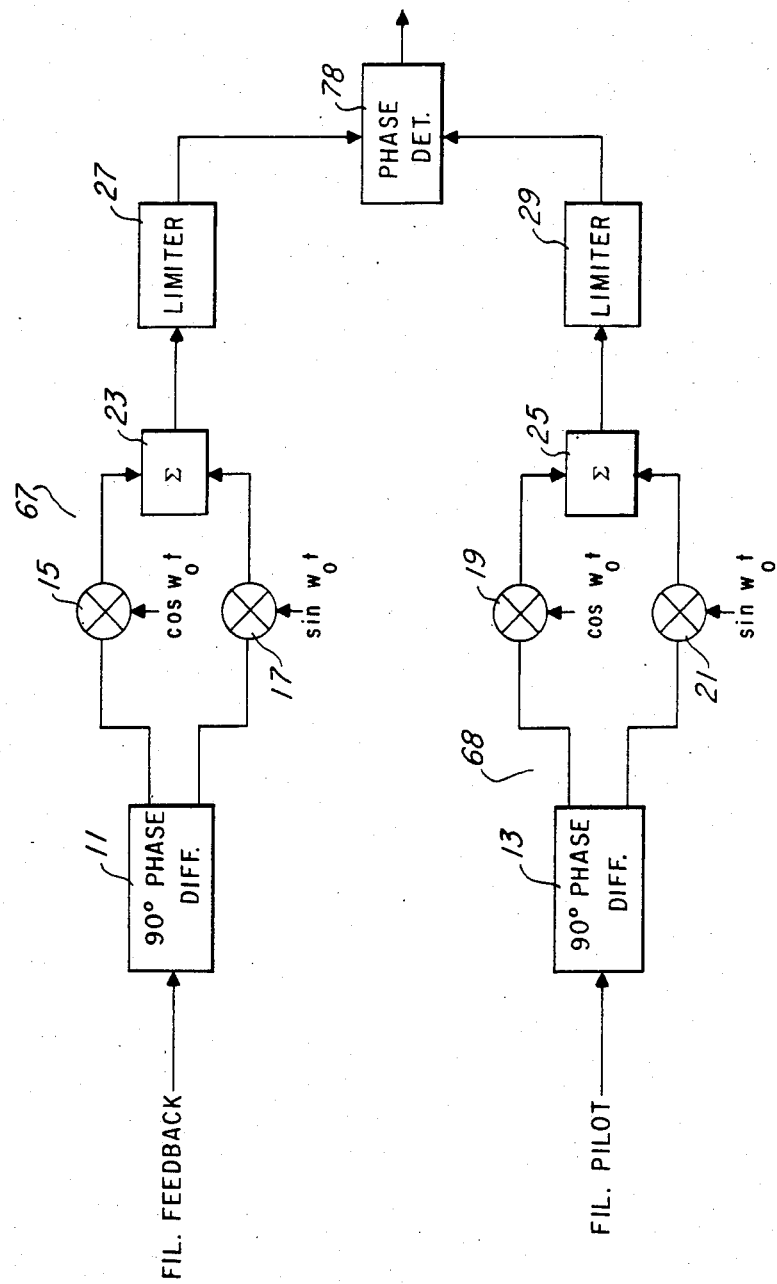
FIG. 3 is a simplified diagram illustrating the single sideband shifting circuitry.

FIG. 3 shows a filtered feedback signal and a filtered pilot signal entering units 67 and 68, respectively. Since the units are identical, the detailed description will relate to the pilot signal for this figure and following figures, with it being understood that the circuitry, unless otherwise specified, is identical for the feedback signal.

The filtered pilot signal enters 90 degrees phase differential unit 13 having a cosine output which is multiplied at 19 by cosine $W_o t$, a signal from a local oscillator to be described later. A sine wave from unit 13 is multiplied at 21 by the sine $W_o t$ which is summed at 25 with the product from multiplier 19, providing a single output to limiter 29 for squaring the output to phase detector 78. The feedback signal is treated in the same fashion and also inputs phase detector 78.

Figure 4A:
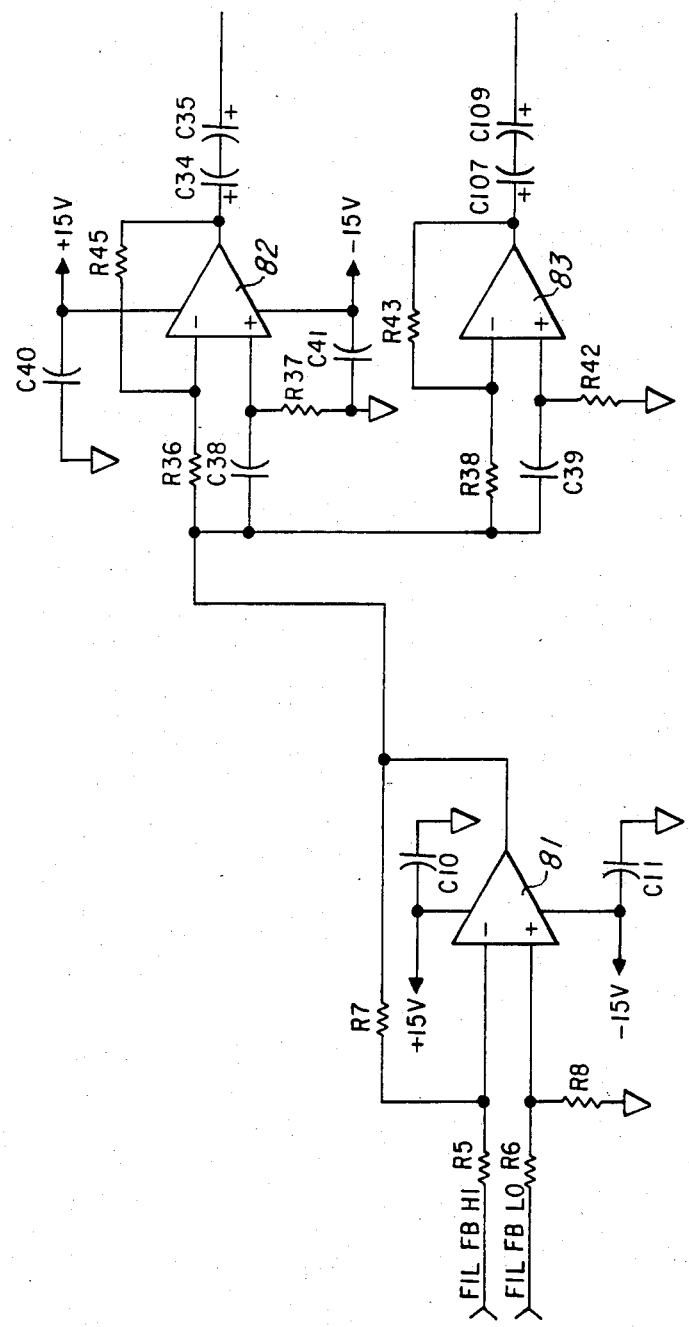
FIGS. 4a and 4b together schematically illustrate a portion of the single sideband shift network for the feedback signal.
Figure 4B:
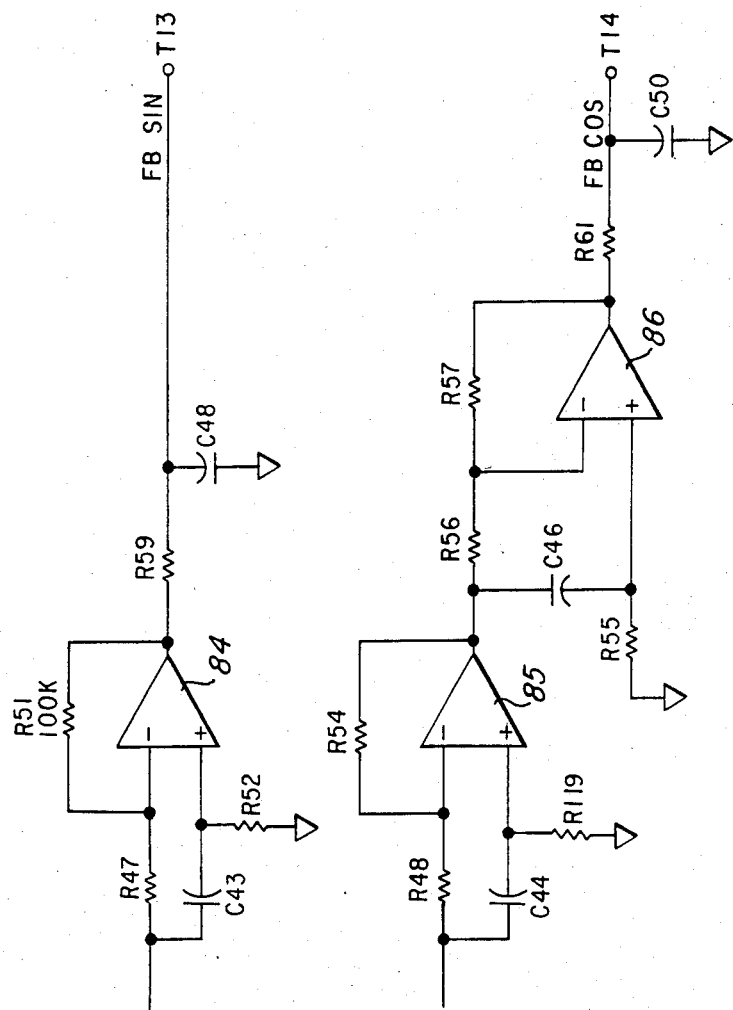

FIGS. 4a and 4b, joined as shown, schematically illustrate the 90 degree phase differential unit 11 for the feedback signal.

Figure 5A:
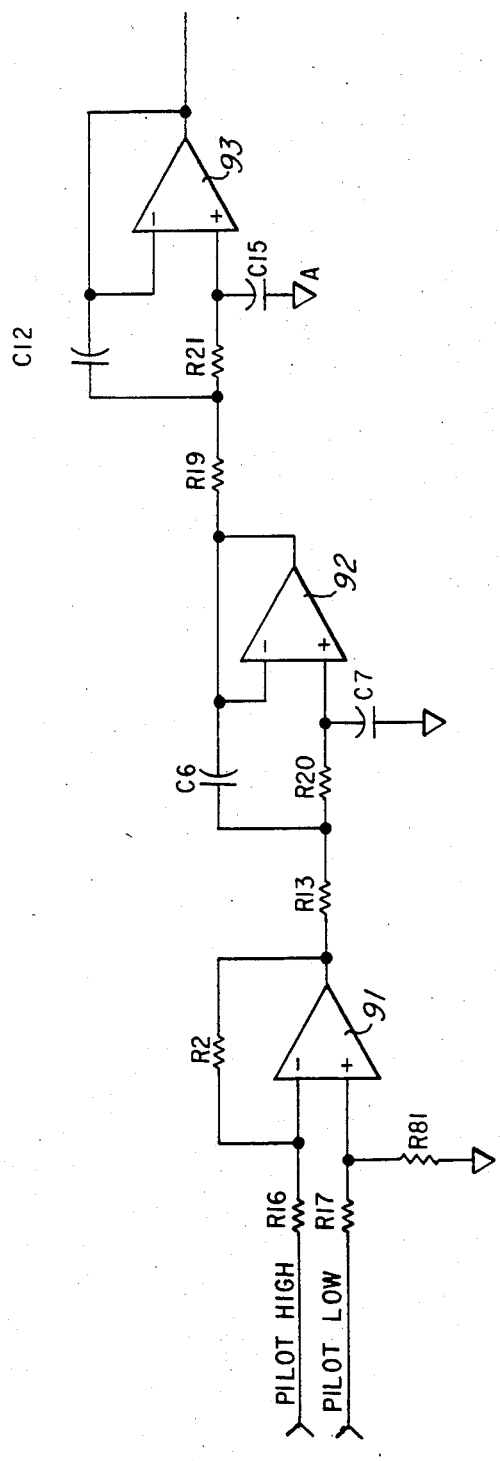
FIGS. 5a and 5b schematically illustrate a portion of the single sideband shift circuitry for the pilot signal.
Figure 5B:
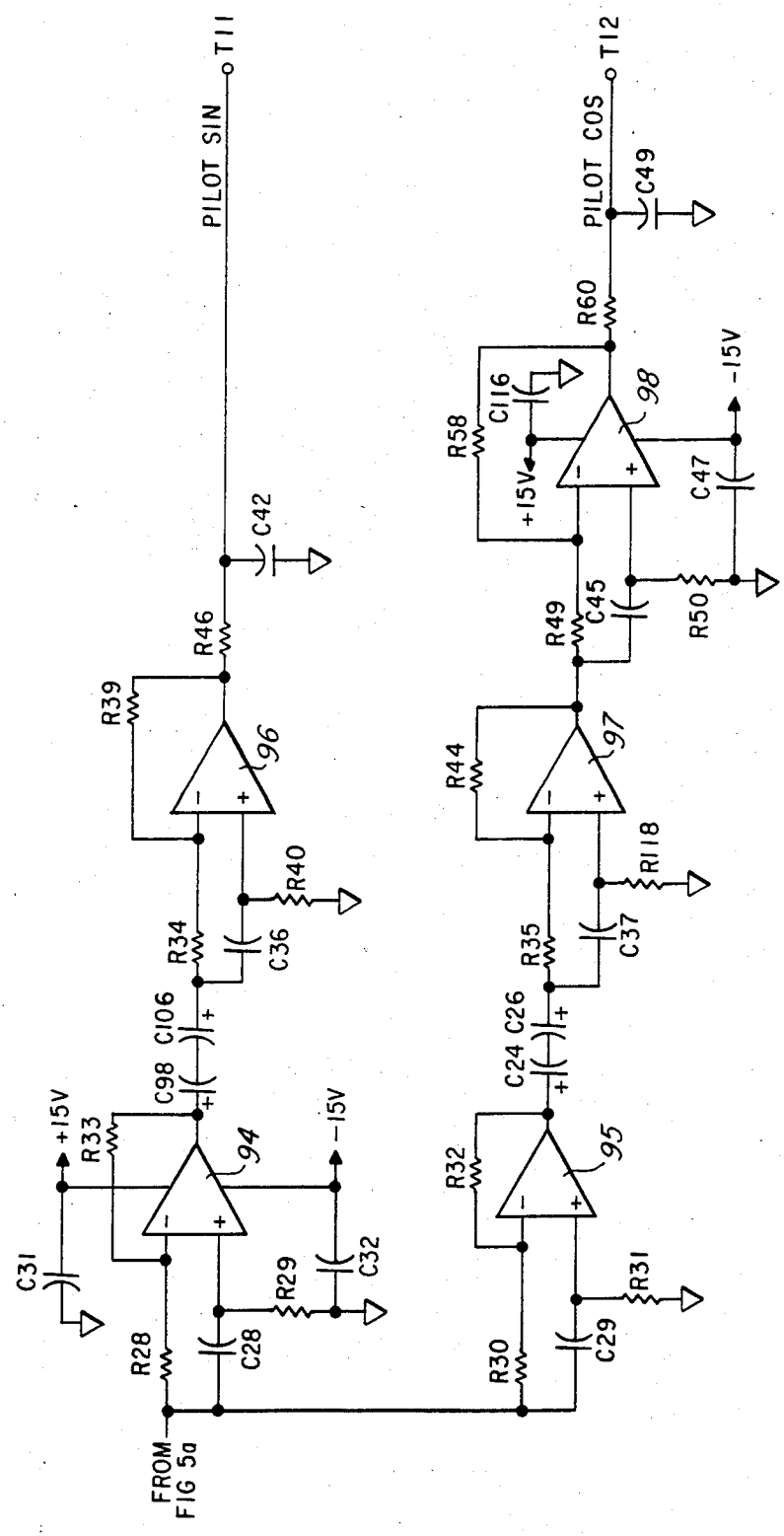

FIGS. 5a and 5b, joined as shown, schematically illustrate the 90 degree phase differential unit 13 for the pilot signal. Pilot high and pilot low signals are shown connected to the negative and positive terminals of operational amplifier 91, respectively. In this preferred embodiment, a dual signal, such as pilot high and pilot low, is employed when moving from one location to another as, for example, from one chip to another. For purposes of transmission, the dual line is used and is single ended by the operation of amplifier 91. Operational amplifier 91 provides an input to a low pass filter made up of operational amplifiers 92 and 93 and the associated components as shown. This low pass filter rolls off at approximately 400 Hz to remove any unwanted harmonic frequencies. It should be noted that in FIGS. 4a and 4b, no such low pass filter is shown. However, such filtering is performed on the feedback signal and is simply not illustrated in these drawings. The filtering is identical to that described for the pilot signal.

The output from operational amplifier 93 provides an input to operational amplifier 94 via resistor R28 and to operational amplifier 95 via resistor R30. The positive input to amplifier 94 is provided by analog ground and impressed through resistor R29. The positive input to amplifier 95 is provided by analog ground impressed through resistor R31. Capacitors C28 and C29 are connected between the output of amplifier 93 and the positive inputs to amplifiers 94 and 95, respectively. The output of amplifier 94 is connected through series capacitors C98 and C106 and through resistor R34 to the negative terminal of operational amplifier 96. Analog ground is impressed through resistor R40 to the positive terminal of amplifier 96. The output of amplifier 96, through resistor R46, provides the signal "PILOT SIN".

The output of amplifier 95, through series capacitors C24 and C26, and through resistor R35 is impressed on the negative terminal of amplifier 97. Analog ground is provided through resistor R118 to the positive terminal. The output of amplifier 97, through resistor R49, is impressed on the negative input of amplifier 98, whose positive input is grounded through resistor R50. The output of amplifier 98, through resistor R60, provides the signal "PILOT COS". Reference to FIGS. 4a and 4b illustrate the identical circuitry with amplifier 84 providing signal "FB SIN" on terminal T13 and amplifier 86 providing signal "FB COS" on terminal T14. Signal "PILOT SIN" is impressed on terminal T11 and signal "PILOT COS" is impressed on terminal T12.

All of the amplifiers discussed in the above detailed description are type TL084MJ manufactured by Texas Instruments.

FIGS. 6a–6d, joined as shown, illustrate the necessary timing for performing the multiplies done by multipliers 15, 17, 19 and 21 of FIG. 3, and the summation of the products. A system clock, from the microcomputer, at approximately 16 MHz, is inverted through inverter 104 and impressed on one input of dual 4-bit binary counter 102, a Texas Instruments type LS393. Output terminal 2Q is connected to the 2CLK terminal of flip-flop 101. The 2Q output of flip flop 101 provides the 1CK input to flip-flop 105 and the negative input to terminal 1A of dual monostable multivibrator 106.

Four bit up/down synchronous counters 116 and 115 are Texas Instruments Type LS169. The RCO terminal of unit 116 is connected to the ENAP terminal of unit 115. The 2Q output of flip flop 105 is signal SIN−/COS which provides the CK input to units 115 and 116 and the A7 cosine or sine select input to memory 118.

Outputs from terminals QA, QB, QC and QD of counter 116 and from terminals QA and QB of counter 115 provide selection inputs to memory terminals A1, A2, A3, A4, A5 and A6, respectively. of memory 118. Sixty four segments of 2 KHz sine and cosine waves are stored in memory 118 and are brought out on terminals D1–D8 to terminals bit 8-bit 1 of multipliers 111 and 119, respectively.

Signals PILOT SIN, PILOT COS, FB SINE AND FB COS are brought in on terminals T11–T14, respectively, to terminals S3, S4, S1, and S2 of switch 114, a type AD7512 DIDT/8838 from Analog Devices. FB SIN or FB COSIN is carried on line 201 to terminal VREF of unit 119. PILOT SIN or PILOT COS is carried on line 202 to terminal VREF of unit 111.

Amplifiers 112 and 113, together with unit 111 and associated circuitry, is a four quadrant multiplier and, in this preferred embodiment, is from Analog Devices which provides a D to A conversion and a multiplication to yield the signal "PILOT ANALOG" impressed on terminal T17. Amplifiers 121 and 122, together with unit 119, form an identical D/A-multiplier combination providing signal "FB ANALOG" at terminal T18.

NAND gate 107 has one input, signal SIN−/COS, from the 2Q terminal of flip-flop 105 and the other input from terminal 1Q of one-shot 106. The output of one-shot 106 also provides one input to NAND gate 108. The 1Q output of flip flop 105 is connected to the 1D input to that unit and also provides the other input to NAND gate 108. The outputs of NAND gates 107 and 108 are signals COS HOLD− and SIN HOLD− impressed on terminals T15 and T16, respectively.

Figure 7A:
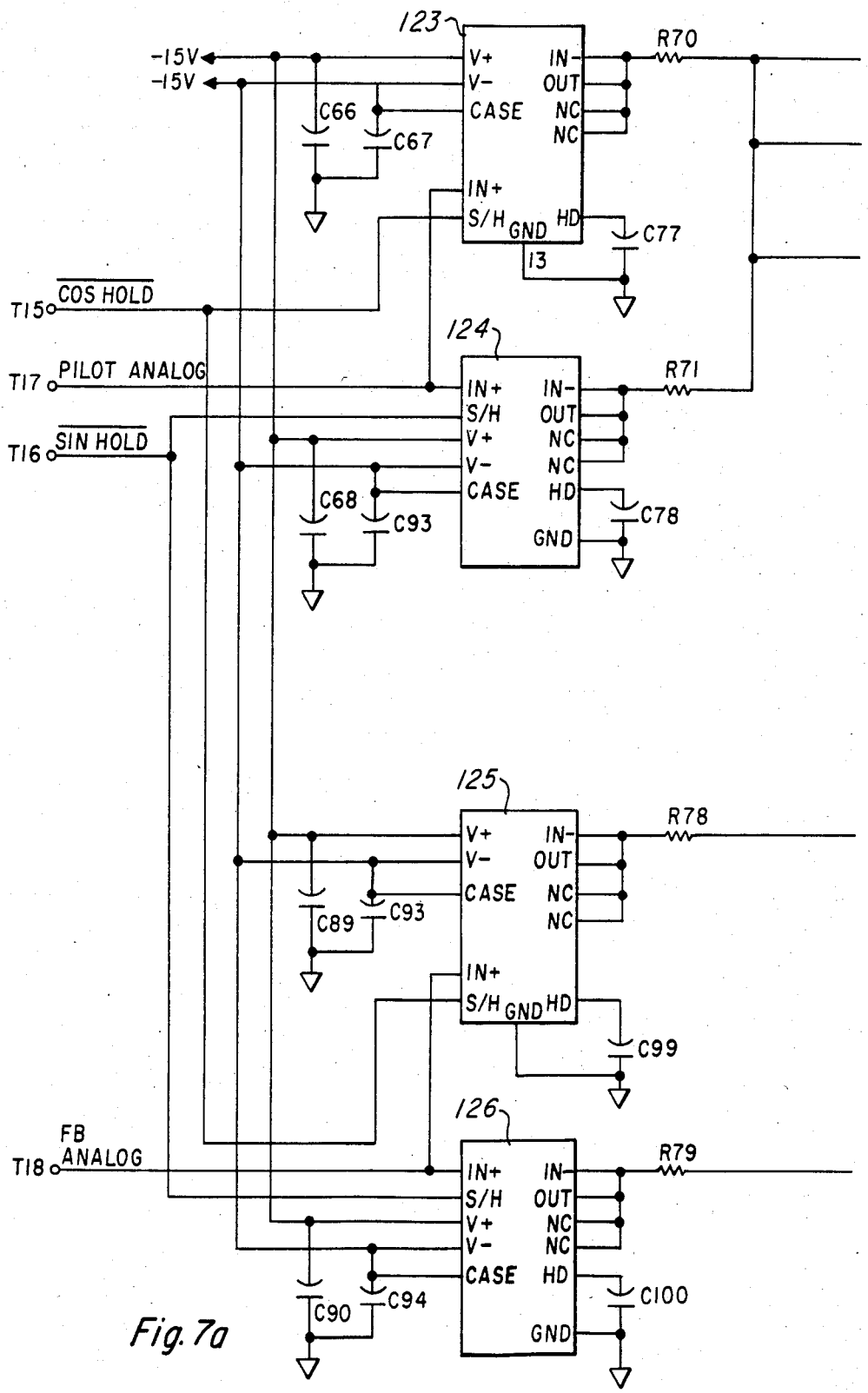
FIGS. 7a–7c, joined as shown, illustrate schematically still another portion of the single sideband shift network.
Figure 7B:
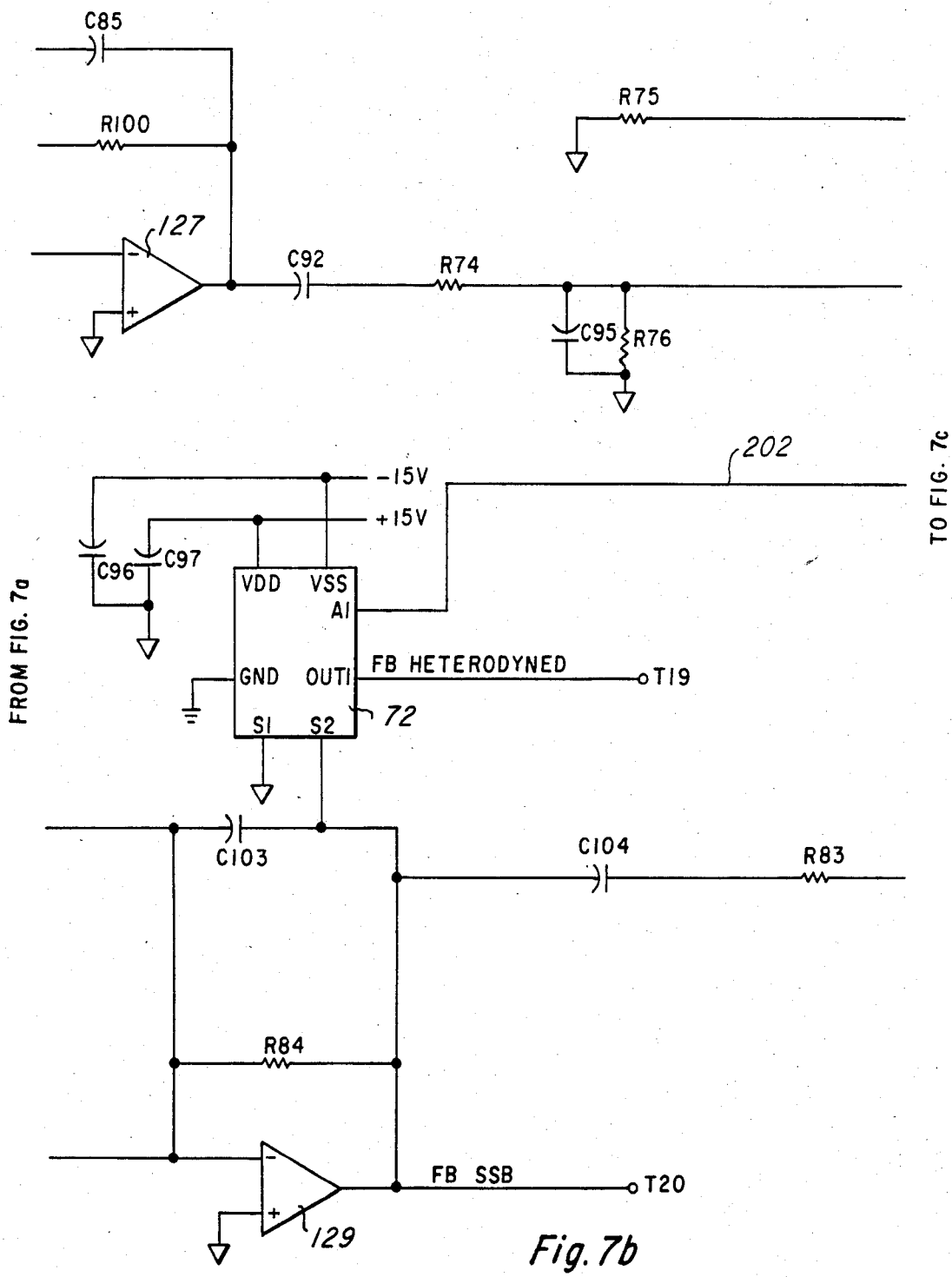
Figure 7C:
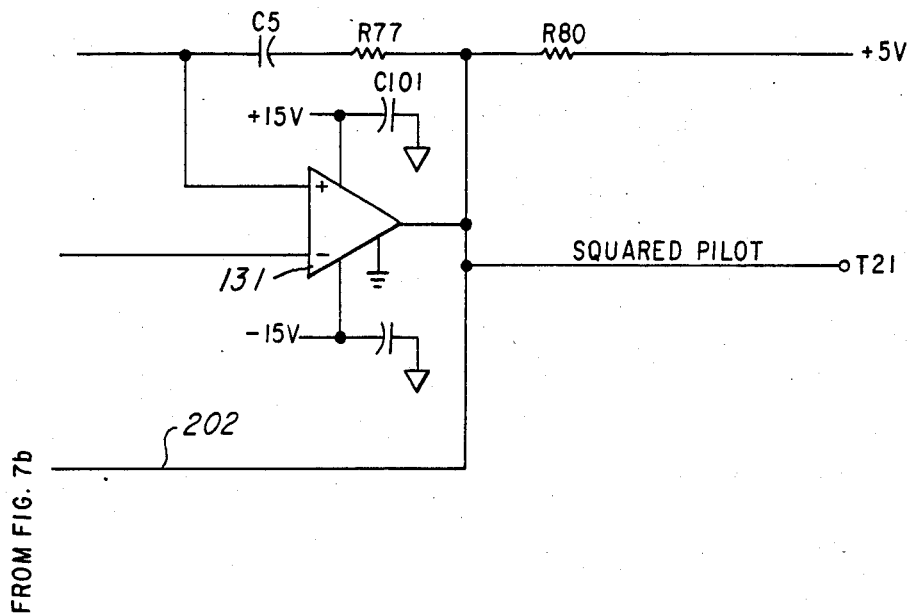
Figure 7C:
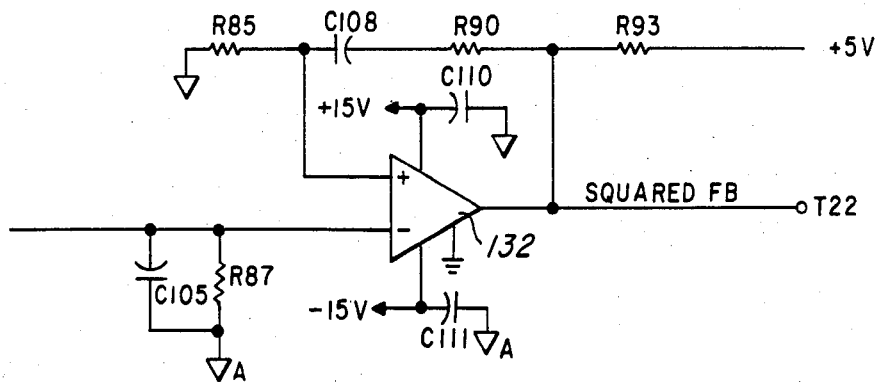

Referring to FIGS. 7a–7c, the input signals COS HOLD is impressed on terminal S/H of each of sample and hold circuits 123 and 125. Signal SIN HOLD− is impressed on the S/H terminal of each sample and hold circuits 124 and 126. These sample and hold circuits, in this preferred embodiment, are type AD583K from Analog Devices.

The pilot analog signal is impressed on the IN+ terminals of units 123 and 124 while the FB analog input is impressed on terminals IN+ of units 125 and 126. The pilot analog signal is gated out of units 123 and 124 by either the COS HOLD− or SIN HOLD− signals to the negative terminal of amplifier 127 whose output, through capacitor C92 and resistor R74, is impressed on the negative input of amplifier 131. The output of amplifier 131, because of its biased positive input, is a squared pilot signal impressed on terminal T21.

The FB analog signal is gated out of units 125 and 126 by either the COS HOLD− or SIN HOLD− signals to the negative terminl of amplifier 129 whose output is signal FB SSB (feedback single sideband) impressed on terminal T20. This signal is also impressed on terminal S2 of analog switch 72 (shown as a multiplier in FIG. 2). The output of amplifier 131 of FIG. 7c is connected to line 202 which provides the input to terminal A1 of analog switch 72. The multiplication of this squared wave with the signal FB SSB yields the signal FB HETERODYNED at terminal T19. The squared pilot and squared FB signals at terminals T21 and T22 are input to the phase detector 78.

Figure 8:
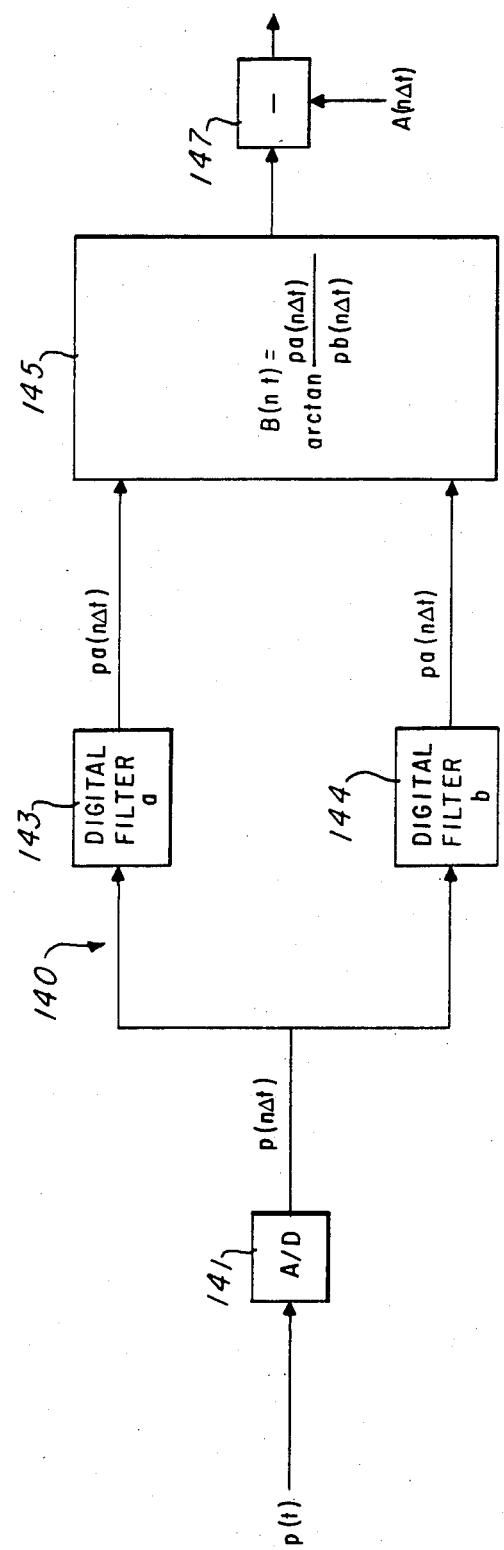
FIG. 8 schematically illustrates a digital alternative for continuous phase detection.

FIG. 8, in block form, illustrates a digital alternative 140 to the preferred embodiment single sideband shift and phase detect technique described above. The pilot signal p(t) is input to A/D converter 141 whose output is signal P(nΔt) providing an input to each of digital filters 143 and 144. The output of digital filter 143 is signal pa(nΔt) and the output of digital filter 144 is signal pb(nΔt), both input to module' 45 of the digital computer. As indicated, digital computer 145 calculates phase B (nΔt) by computing arctan pa(nΔt)/pb(nΔt). The difference between phase B(nΔt) and A (nΔt) (from an identical structure for the feedback signal) are differenced at unit 147, also a part of the computer, to provide a digital representation of phase difference. The digital filters are designed to satisfy the equations:

$$pa(n \Delta t) = \sum_{j=0}^{N} p(n - j) \times Fa(j)$$

$$pb(n \Delta t) = \sum_{j=0}^{N} p(n - j) \times Fb(j)$$

Coefficient Fa(j) and Fb(j) are selected to produce a 90 degree phase difference in the signals pa(nΔt) and pb(nΔt).

Figure 9A:
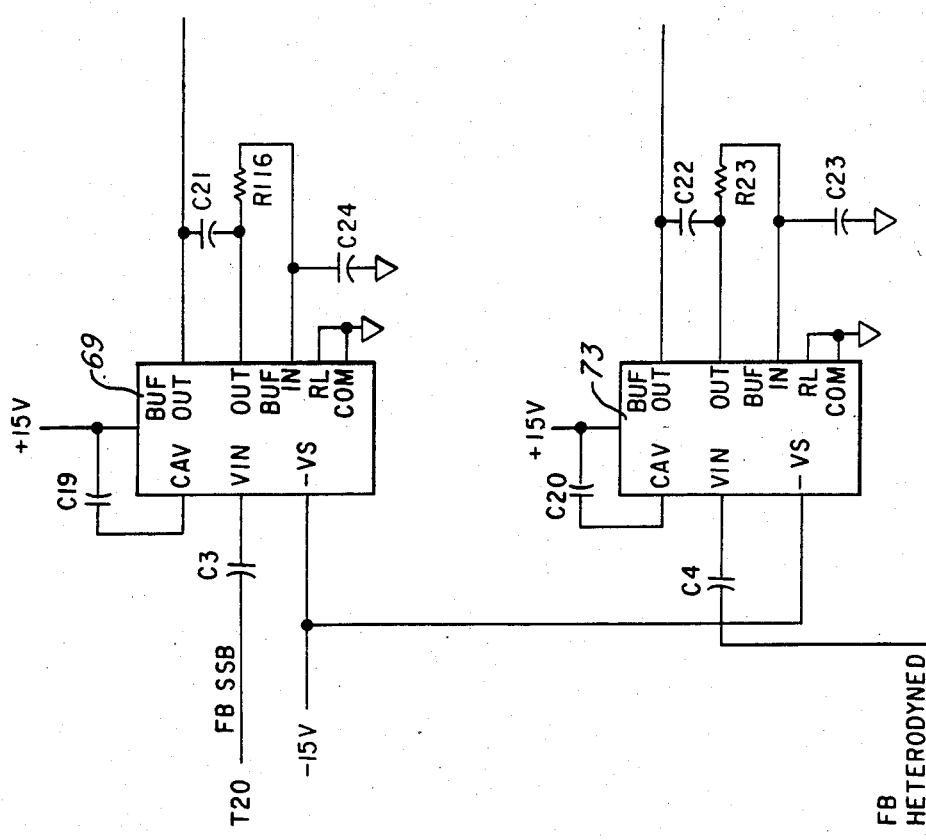
FIGS. 9a and 9b together schematically illustrate development of the feedback RMS and the fundamental RMS voltage levels.
Figure 9B:
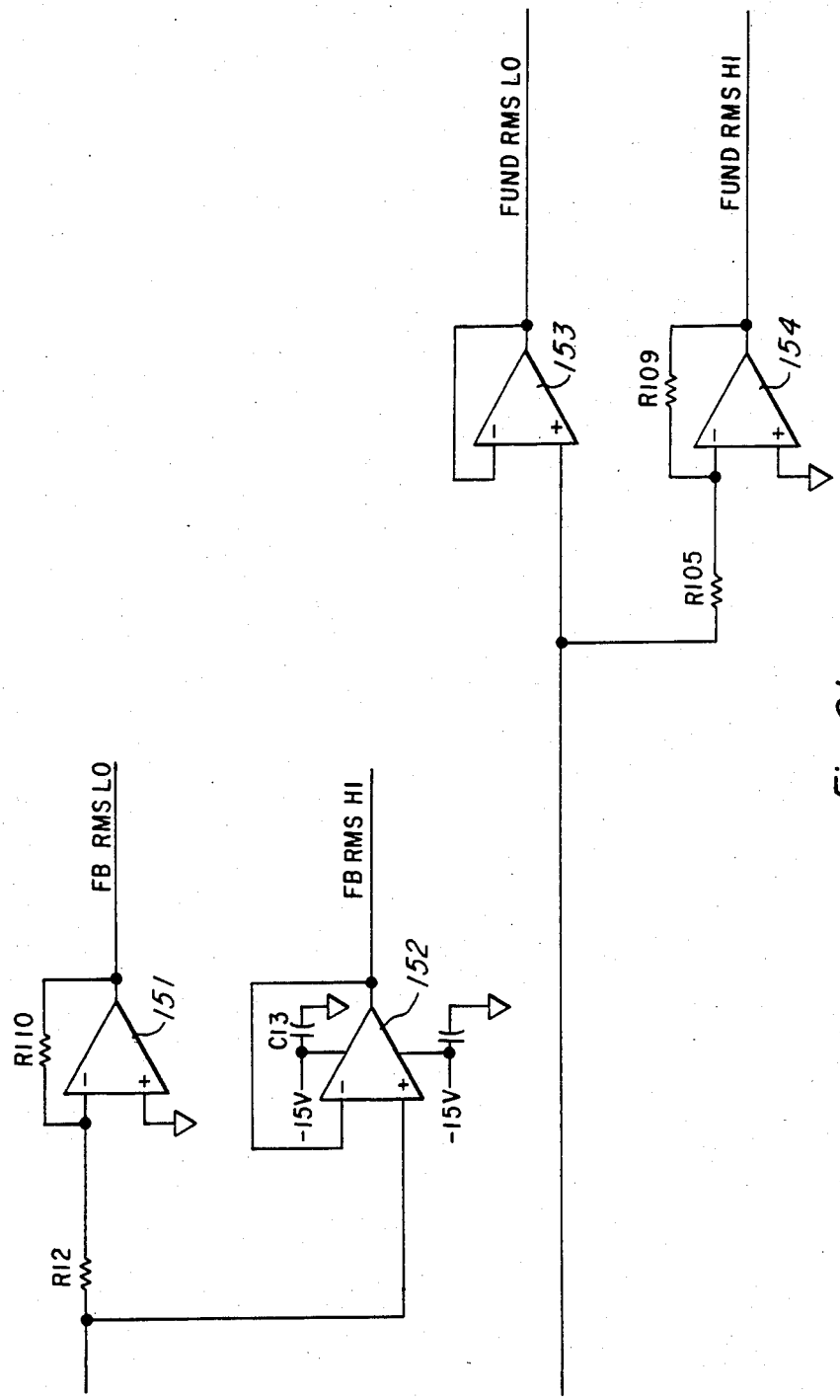

Digital filters 143 and 144 could also be implemented, as is well known, in the digital computer. FIGS. 9a and 9b show the FB HETERODYNED signal from terminal T19 (which is the fundamental signal) applied through capacitor C4 to terminal VIN of RMS converter 73. Signal FB SSB from terminal T20 is shown impressed, through capacitor C3, on terminal VIN of RMS conerter 69. Circuits for signals FB SSB and the fundamental are identical and the circuitry for signal FB SSB shall be described. The OUT terminal of unit 69 provides an input to the positive terminal of amplifier 152, and through resistor R12 to the negative terminal of amplifier 151. The output of amplifier 151 is signal FB RMS LO and the output of amplifier 152 is signal FB RMS HI. In exactly the same signal development, signal FUND RMS LO is output from amplifier 153. Amplifier 154 provides output signal FUND RMS HI. These signals, as mentioned earlier, are double ended because of an exit and are brought together in the digital computer component amplitude compensator 75.

Figure 10A:
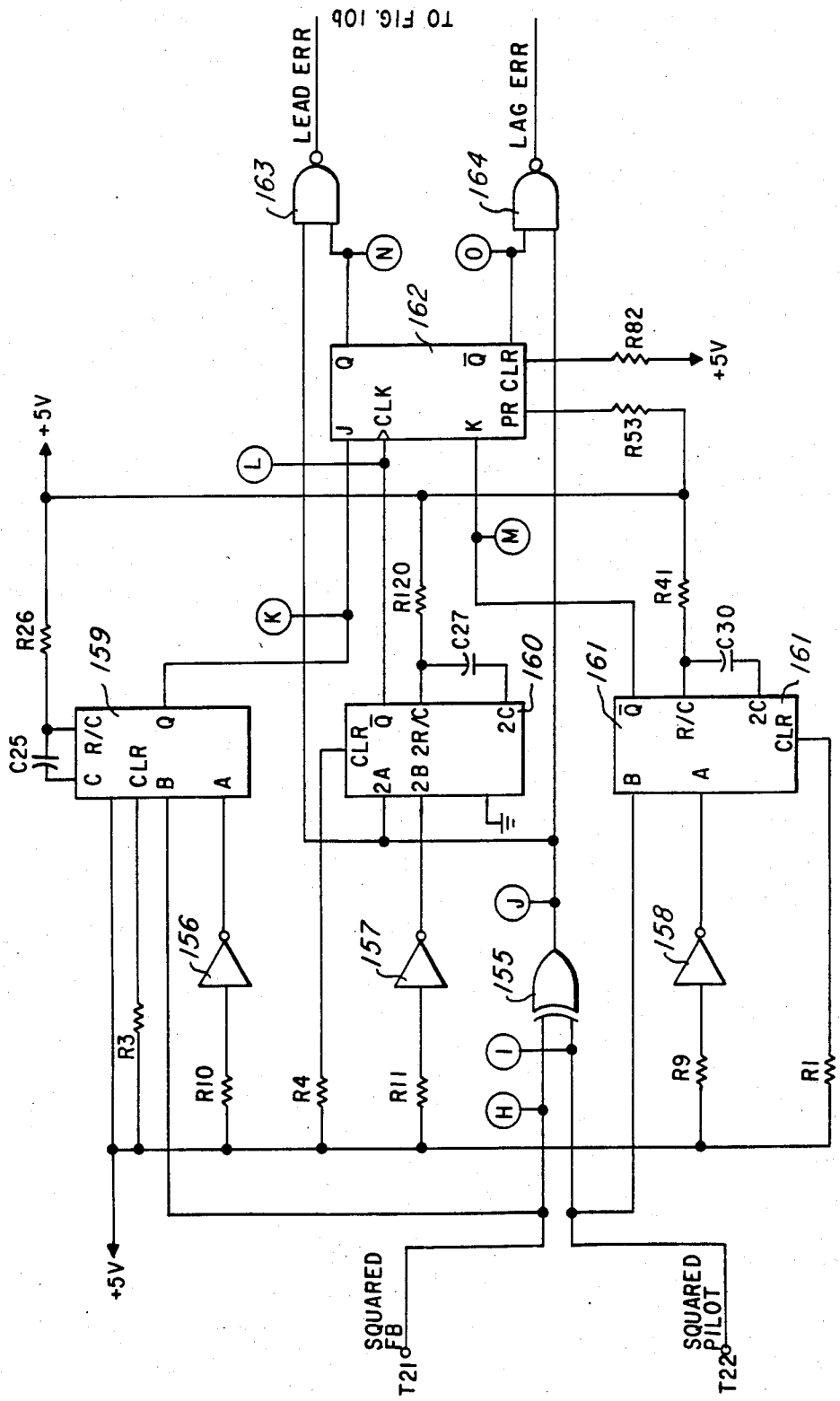
FIGS. 10a and 10b together schematically illustrate the phase detector of this invention.
Figure 10B:
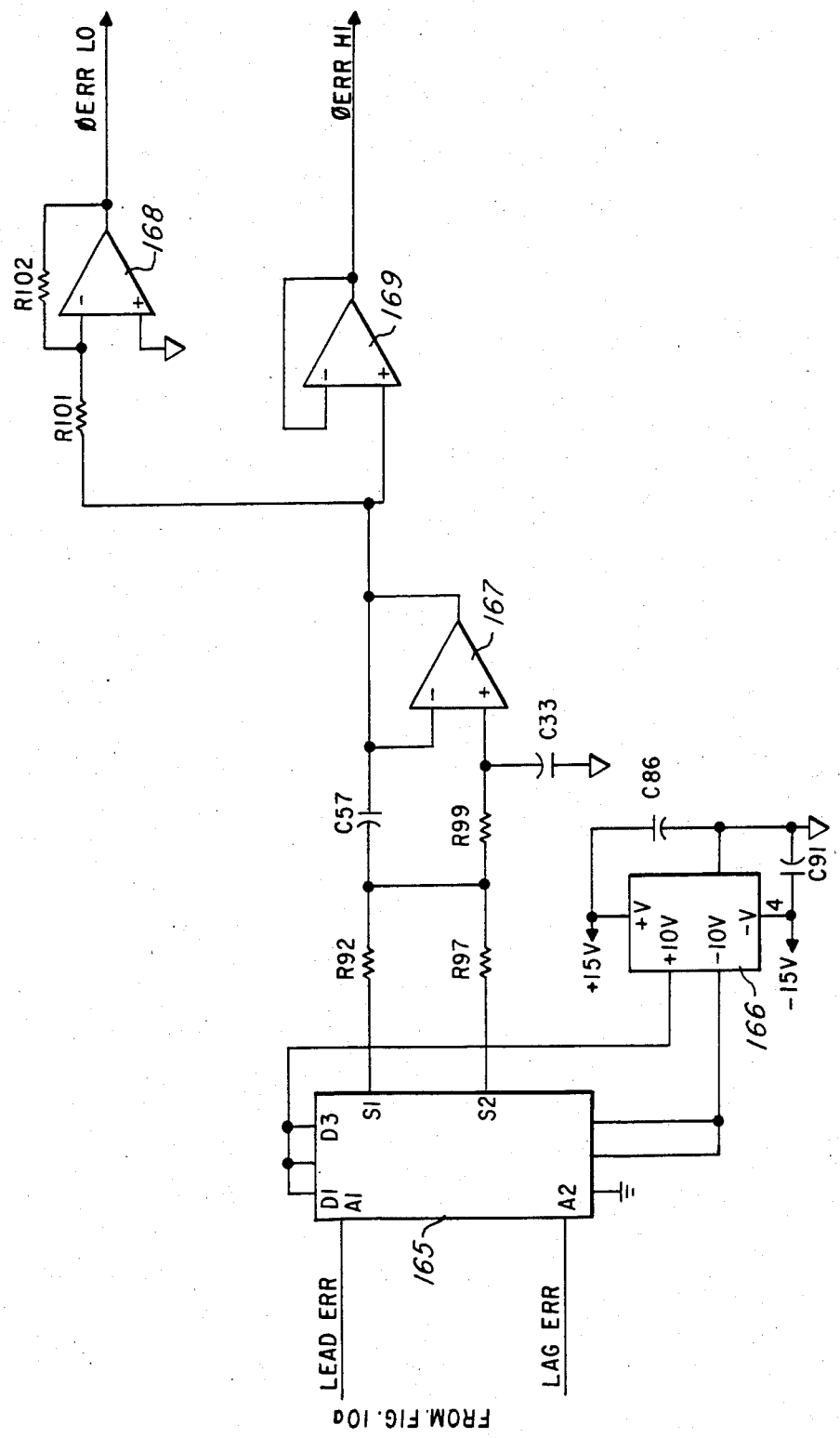

FIG. 10a is a schematic diagram of a prior art phase detector circuit with input signals squared FB and squared PILOT. No detailed description is required but waveforms will be discussed in connection with the mode of operation. Suffice it to say at this point that NAND gate 163 provides output signal LEAD ERR and NAND gate 164 provides signal LAG ERR. These signals are input to terminals A1 and A2, respectively, of analog switch 165, a type AD7511DIDT/883B from Analog Devices. Terminal S1 or terminal S2 will provide an output, depending upon whether it is a LEAD ERR or LAG ERR to drive amplifier 167. Amplifier 167 in turn drives amplifiers 168 and 169 to provide a doubled ended output signal for ERROR LO and ERROR HI. These signals are applied to the phase compensator 81 of the digital computer.

Figure 13:
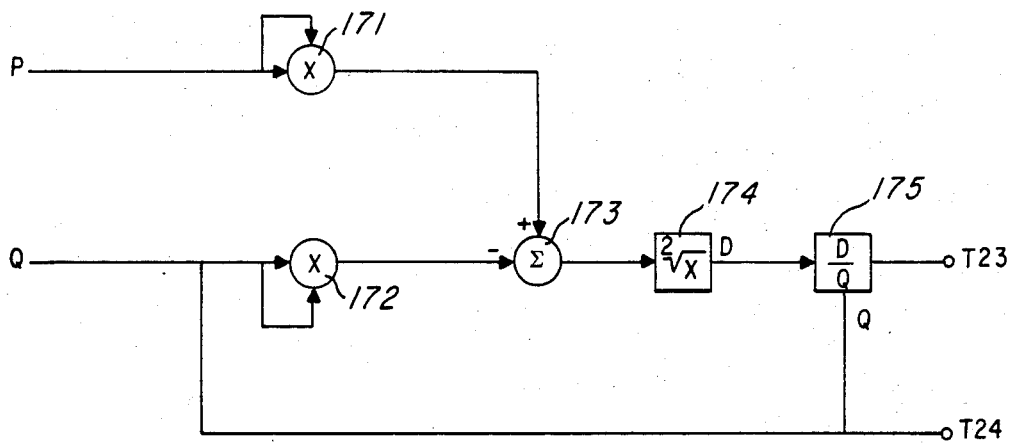
FIG. 13 schematically illustrates the digital development of the distortion to fundamental ratio.

Turning now to FIG. 13, the digitized feedback signal is shown as "P" and the digitized fundamental signal is shown as "Q". Signal P is squared at multiplier 171 and signal Q is squared at multiplier 172. The difference these squares is taken at summation 173 and the square root is taken at 174 to provide, at 175, the ratio of the distortion to the fundamental signal shown as D/Q at terminal T23. A digital fundamental signal Q is provided at terminal T24.

Figure 14:
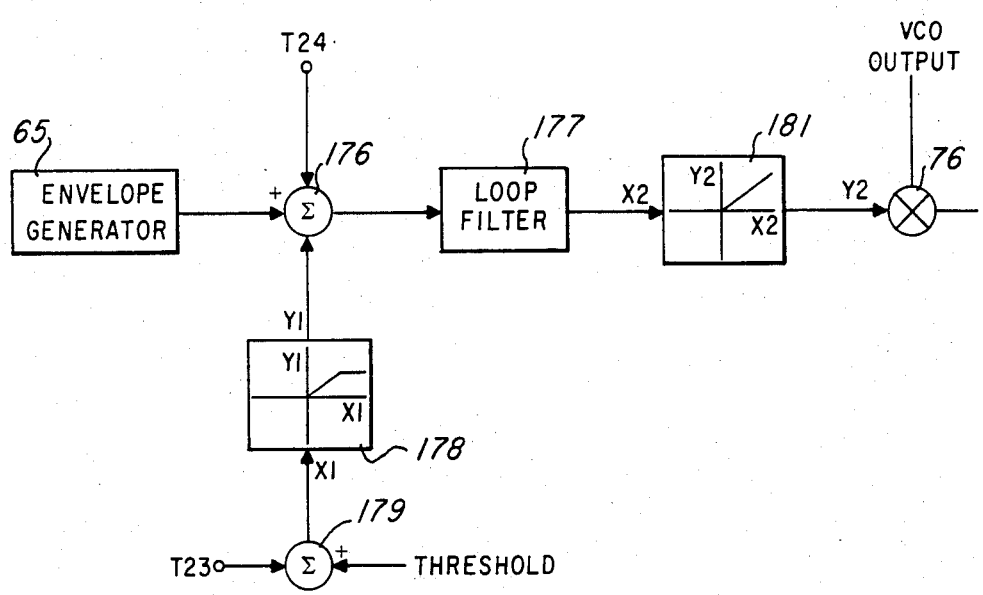
FIG. 14 illustrates the digital development of the control signal.

FIG. 14 illustrates envelope generator 65 providing an input to summation point 176. The fundamental digital representation from terminal T24 also provides an input at 176. The ratio of distortion to fundamental from terminal T23 is summed at 179 with a predetermined threshold level. The output of summation 179 is sent to limiter 178 to prevent any negative entry and also to limit the positive amplitude, the output of limiter 178 also being summed at 176. The summed output from 176 enters loop filter 177 which is an integrator for controlling the loop. The output of loop filter 177 is limited through limiter 181 to prevent any negative output. At multiplier 76, the output from limiter 181 is multiplied with the VCO output from analog wave synthesizer 77 to provide a digital representation of the control signal which, by way of unit 77, is output as an analog signal to the power amplifier 57 shown in FIG. 2.

MODE OF OPERATION

For this discussion, please refer continually to FIG. 2, as well as to those figures specifically referenced.

Referring to FIG. 2, the output signals from accelerometers 53 and 56 are summed in summation amplifier 62 and then selected by switch 63 as to mass accelerometer 53, pad accelerometer 56, o the weighted sum of the two from amplifier 62. The selected signal is the feedback signal which is single sideband shifted by unit 68 and output to RMS converter 69 and multiplier 72. The RMS value of the total feedback signal is provided out of RMS converter 69 and the fundamental RMS value is provided out of RMS converter 73. These signals are digitized in A to D converters 71 and 74, respectively, and sent to the amplitude compensator 75.

Figure 6A:
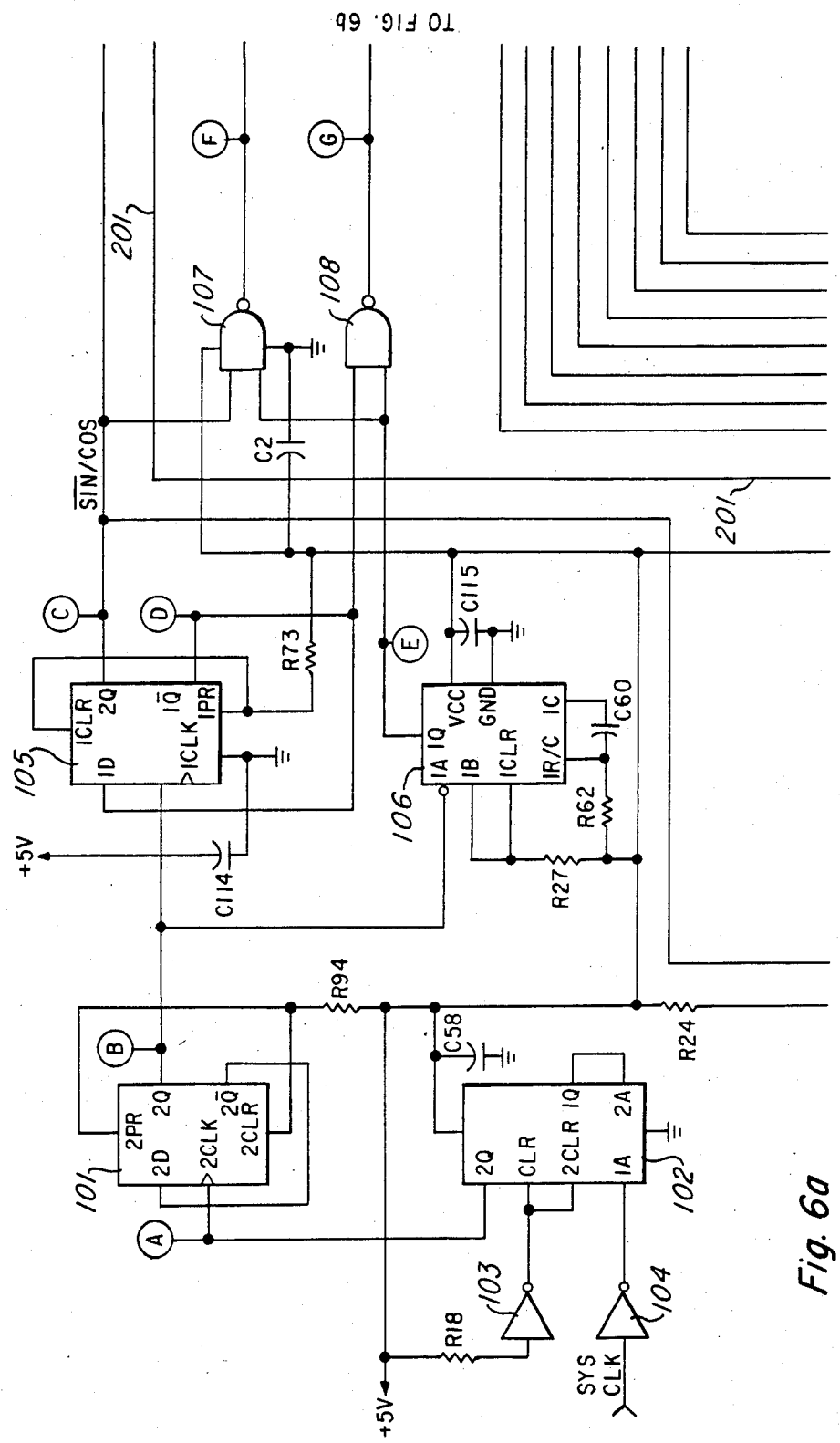
Figure 6B:
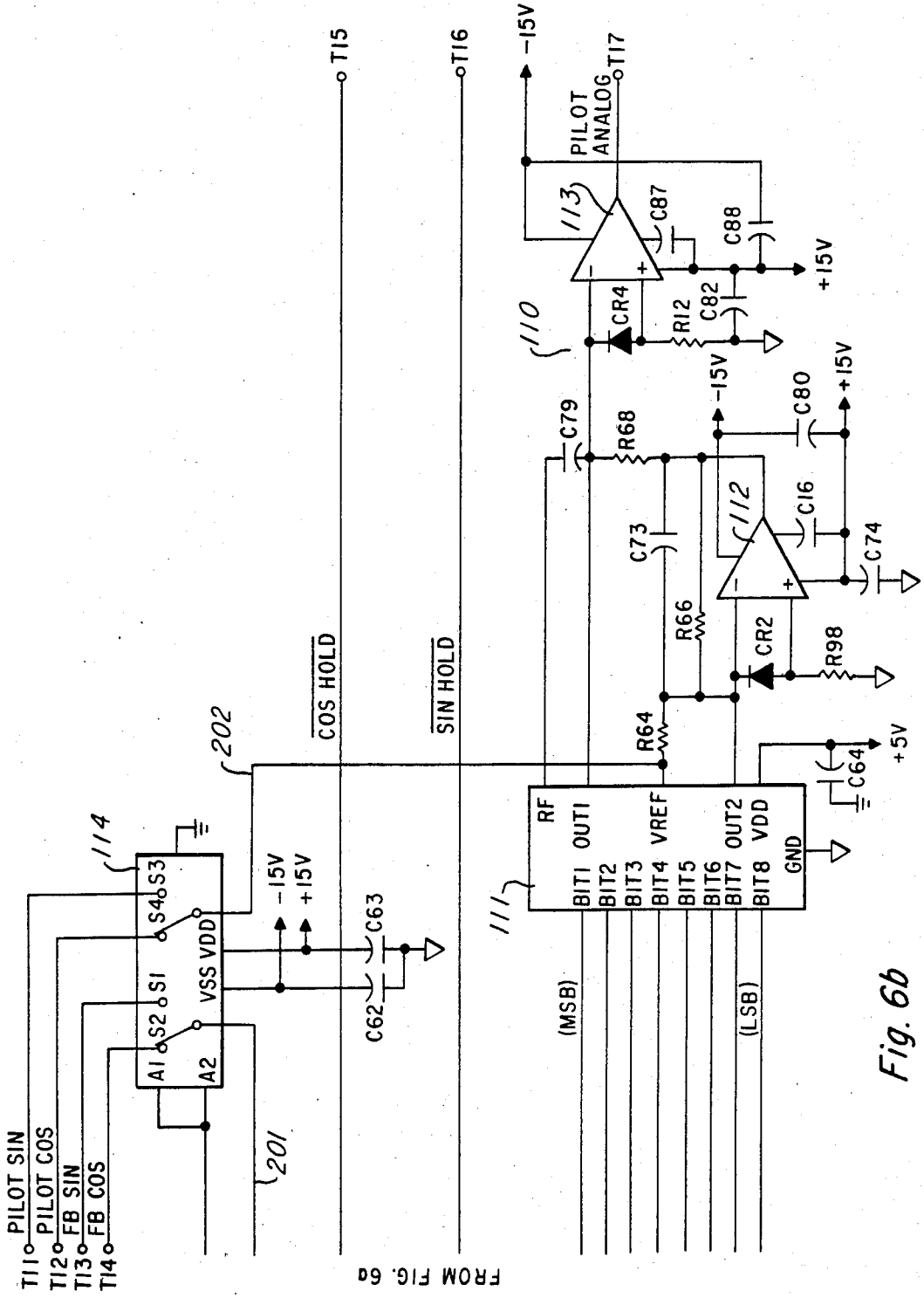
Figure 11:
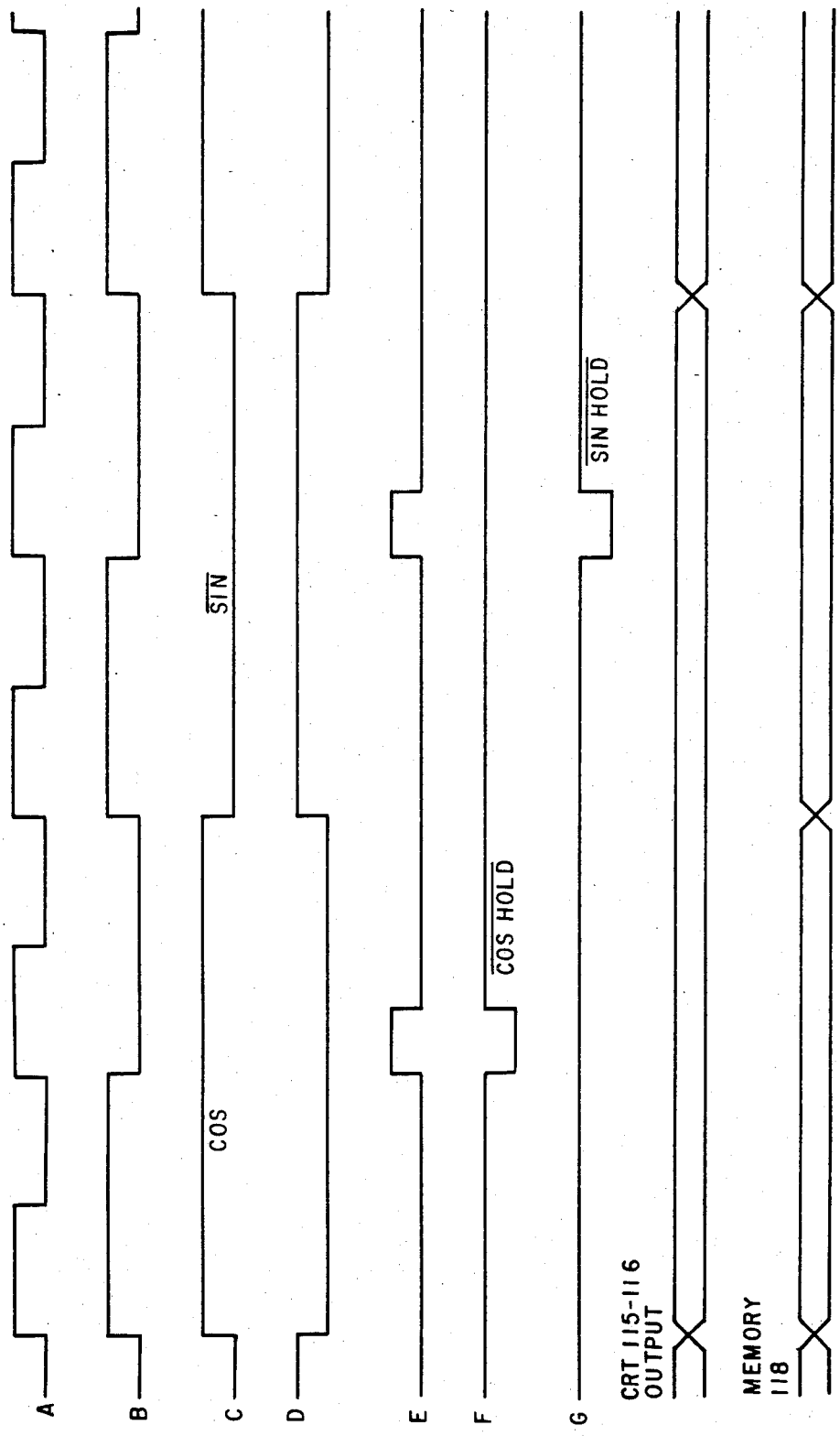
FIG. 11 illustrates waveforms relating to the timing of a single sideband shifting network.

Referring now to FIG. 6a, please note that signals A-G are shown at selected points. FIG. 11 shows the various waveforms at those points. Signal A is shown as a square wave for clocking flip-flop 101. Signal B, the output of flip-flop 101, as expected, is at one half the frequency of signal A. Signal C, the output from flip-flop 105, is again halved in frequency to provide the output signal SIN−/COS. Signal D is the inverse of signal C. The output of one shot 106 is signal E. The output of NAND gate 107 is signal F and the output from NAND gate 108 is signal G. Signal F is COS HOLD− and signal G is SIN HOLD− which are used for gating the sample and hold circuits described earlier.

Figure 6C:
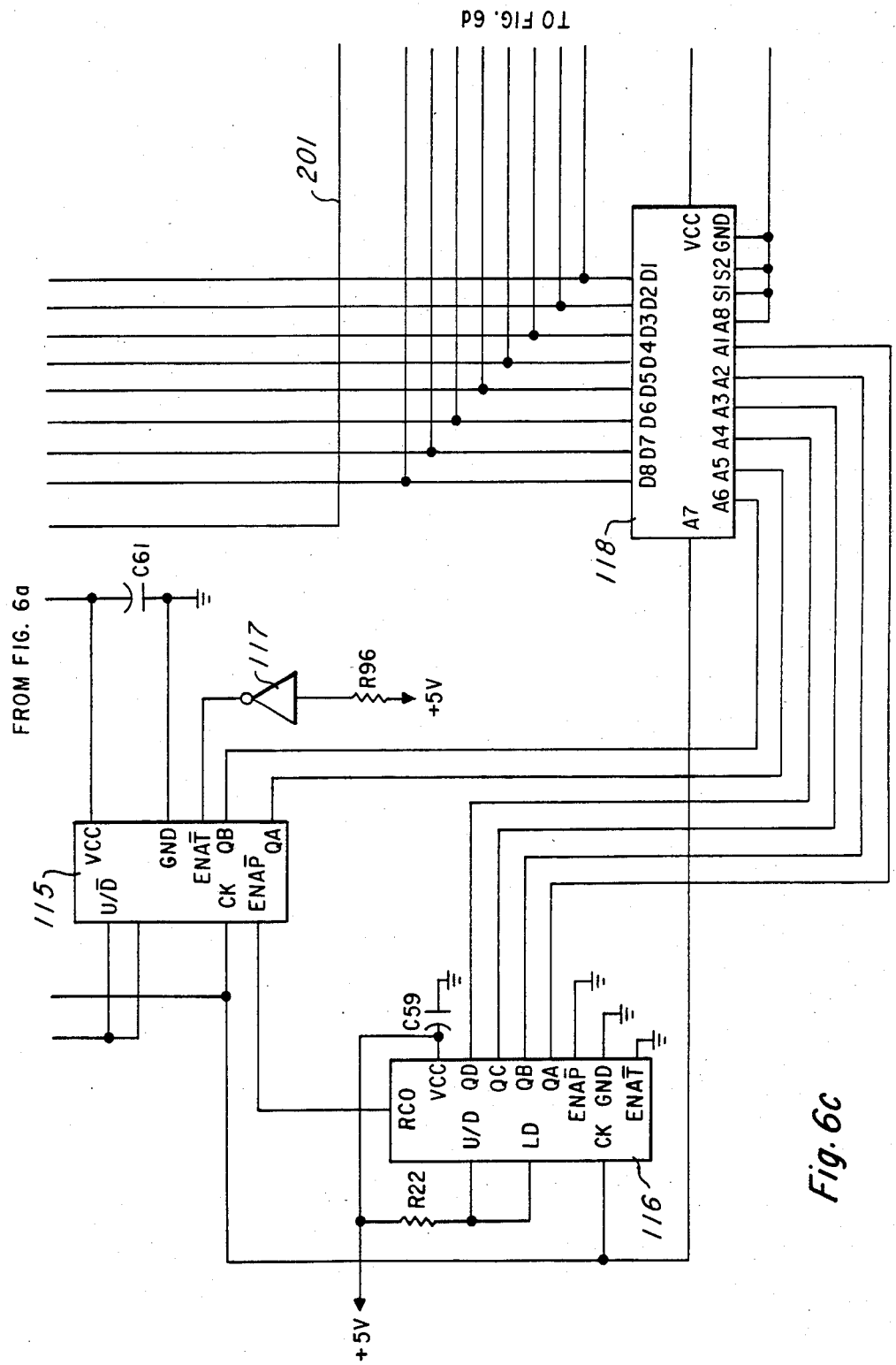

The outputs from counters 115–116 of FIG. 6c are shown and the outputs from memory 118 are shown (as either sine or cosine). These signals then illustrate the operation of the timing for the single sideband shift network.

Figure 12:
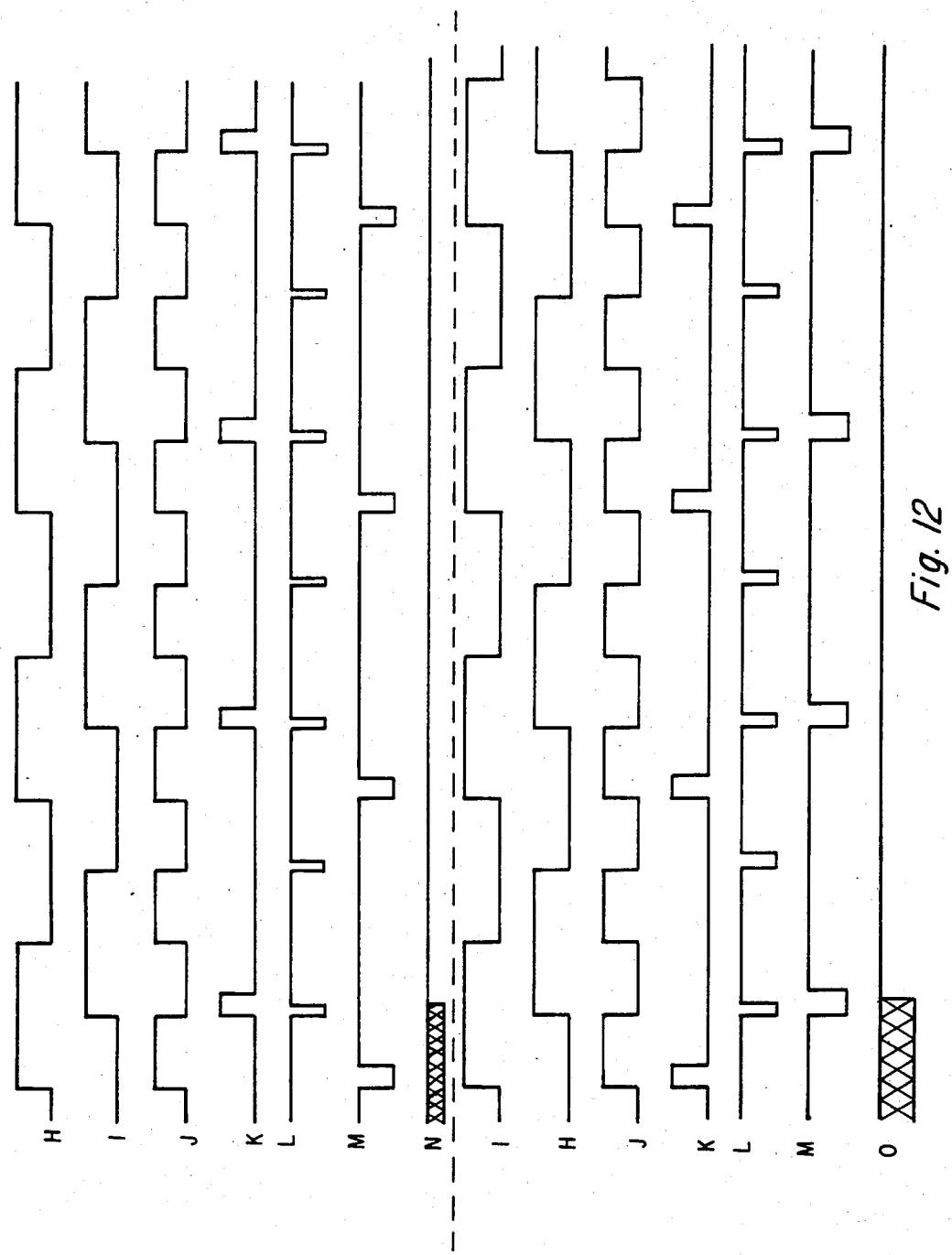
FIG. 12 illustrates timing signals involved in the phase detector.

Refer now to FIGS. 10a and 12 where various signals are shown in the prior art phase detector. Signals H-N on the upper half of the drawing illustrate a LEAD ERR while the lower signals I, H, J, K, L, M and O illustrate the LAG ERR situation. Signal H is the squared FB and signal I is the squared PILOT signal. The output of exclusive OR gate 155 is represented by signal J which is twice the frequency of signals H or I and is triggered by the leading one of these two signals. Signal K is the output from one shot 159 and signal L is the clock input to flip flop 162. Note the difference in time occurrence between signal K above and signal K below. Signal M is the output one shot 221 and the K input to flip-flop 162. Q and Q− outputs from flip-flop 122 are signals N and O. Note that signals N and O are the inverse of each other, as would be expected to signify a LEAD or LAG error.

Figure 15A:
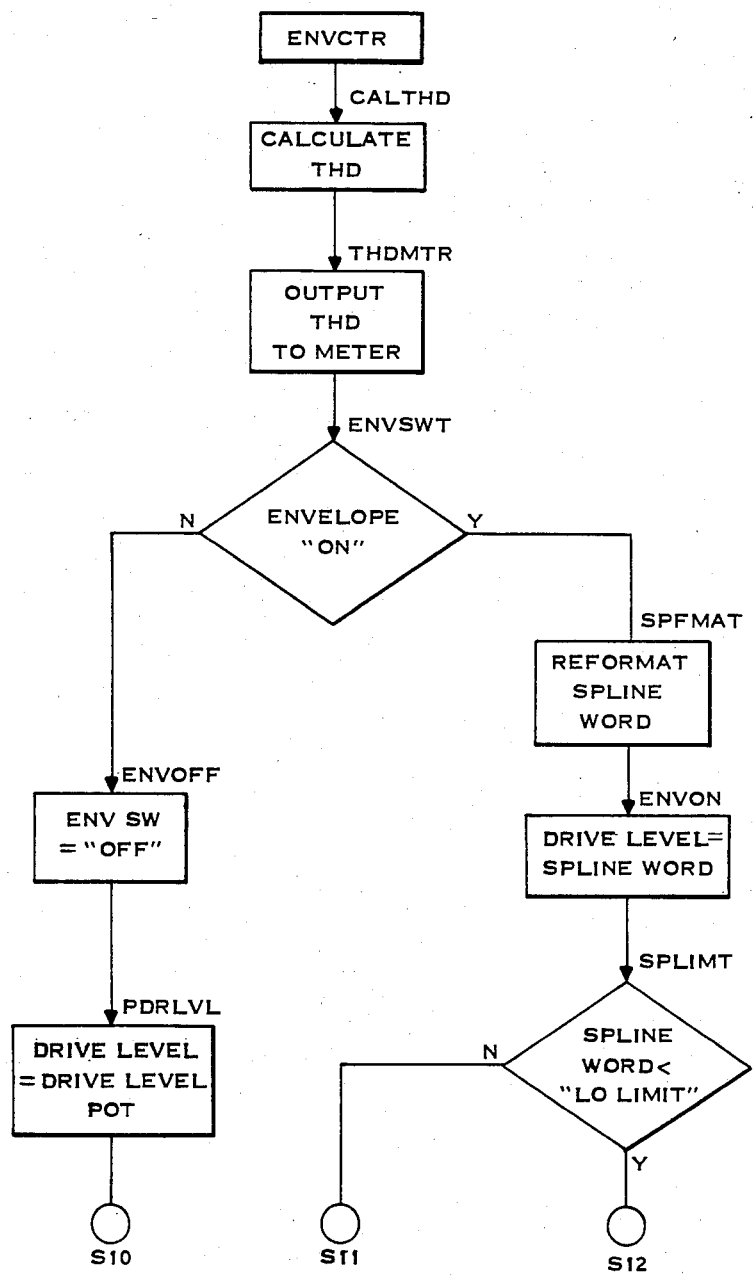
FIGS. 15a–15d form a flow chart describing the digital amplitude correction.
Figure 15B:
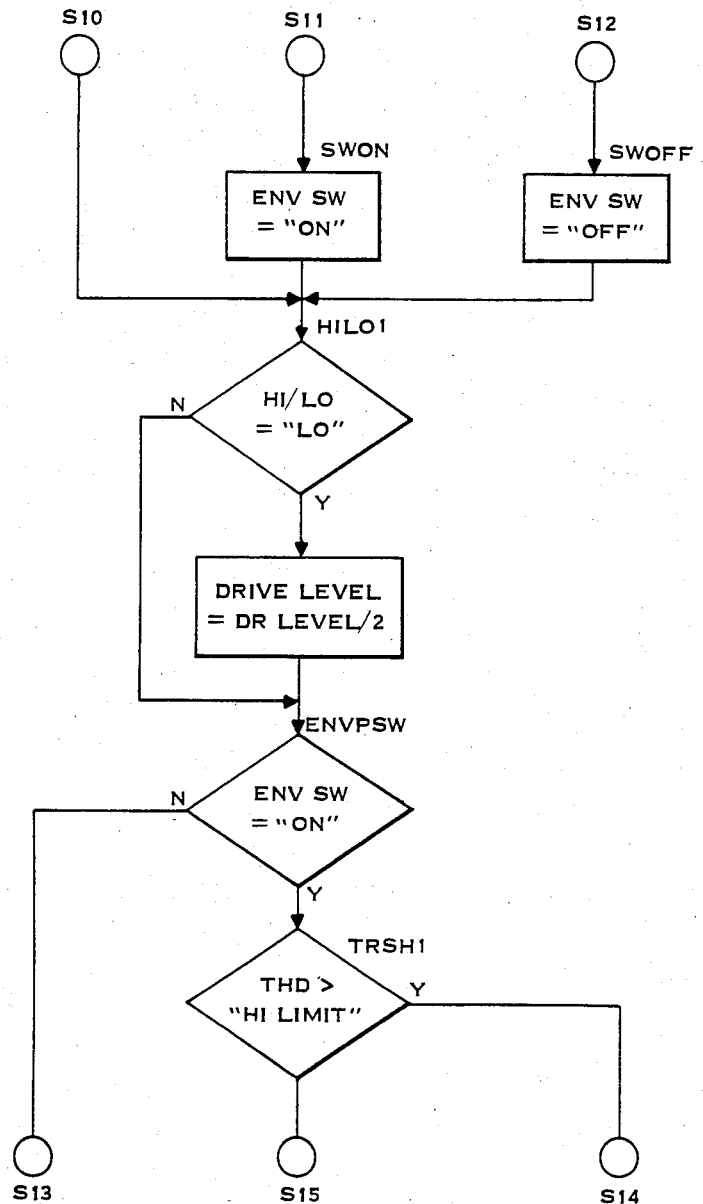
Figure 15C:
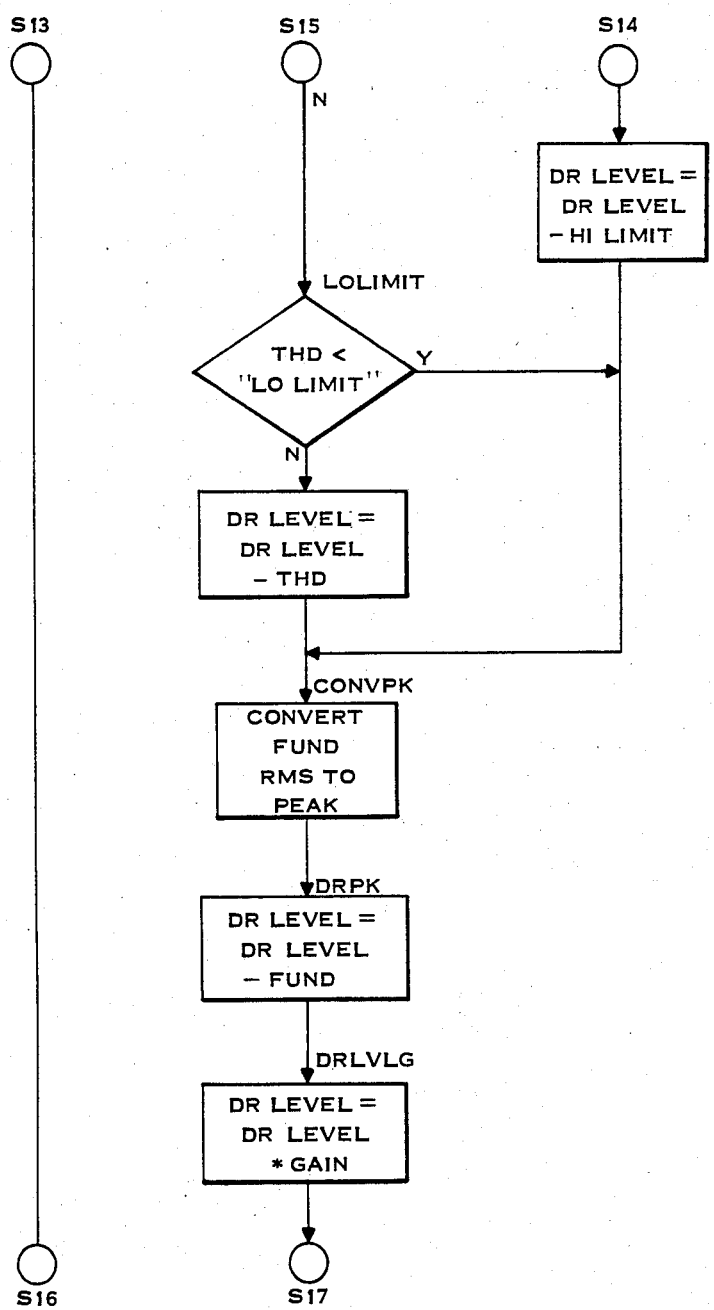
Figure 15D:
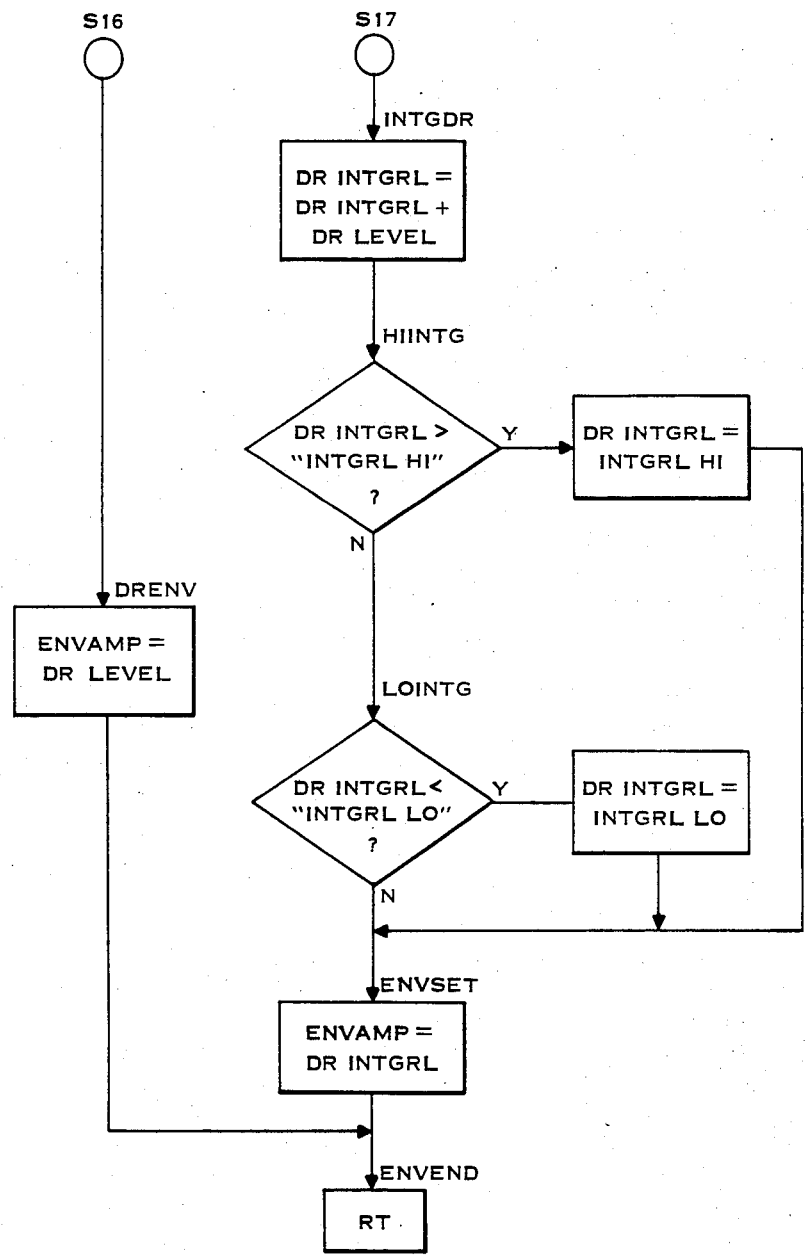

FIGS. 15a–15d illustrate the operation of the amplitude compensator 75 of FIG. 2. Please note that Table 1 is the computer program that makes up this flowchart illustrated in FIGS. 15a–15d. The various components of the flowchart are clearly set out in Table 1, detailing the flowchart symbols. Referring to FIG. 15a, the total harmonic distortion is calculated and there is an output to the meter as shown in FIG. 2 from amplitude compensator 75. A determination is made as to whether the envelope switch is on and if not, the envelope switch equals off and the drive level equals drive level pot. If the envelope switch is on, the spline word is reformatted. The spline word defines a point on the envelope of the envelope generator. Then the drive level is made to equal a spline word, and the determination is made as to whether the spline word is less than the low limit. If it is not, then the envelope switch is on. If it is, then the envelope switch is off. Next, the high/low equals low determination is made. If the answer is yes, then the drive level is divided by two, for some reason such as proximity to a building. If the answer is no, then a determination is made as to whether the envelope switch is on. If the answer is yes, then it is determined whether the total harmonic distortion (7HD) is over the high limit. If the answer is yes, then the drive level equals the level minus the high limit. If the answer is no, then the determination is made whether the THD is less than the low limit. If the answer is no, then the drive level is made equal to the drive level minus the THD. If the answer is yes, fundamental RMS is converted to a peak. The signal DR level minus THD is also converted at that point. Then the DR level equals the DR level minus the fundamental and the DR level equals DR level multiplied by the gain. The drive integral is set to equal the drive integral plus drive level and it is determined whether the drive integral is greater than the integral HI. If the answer is yes, the drive integral is set equal to integral and if the answer is no, it is determined whether the drive integral is less than the integral LO. If the answer is yes, the drive integral is made equal to integral LO. If the answer is no, the envelope control word is made equal to the drive integral. That also is true when the drive integral is equal to the integral HI or equal to the integral LO. This condition is also met when the envelope switch is off. In this way, the amplitude is adjusted.

Figure 16A:
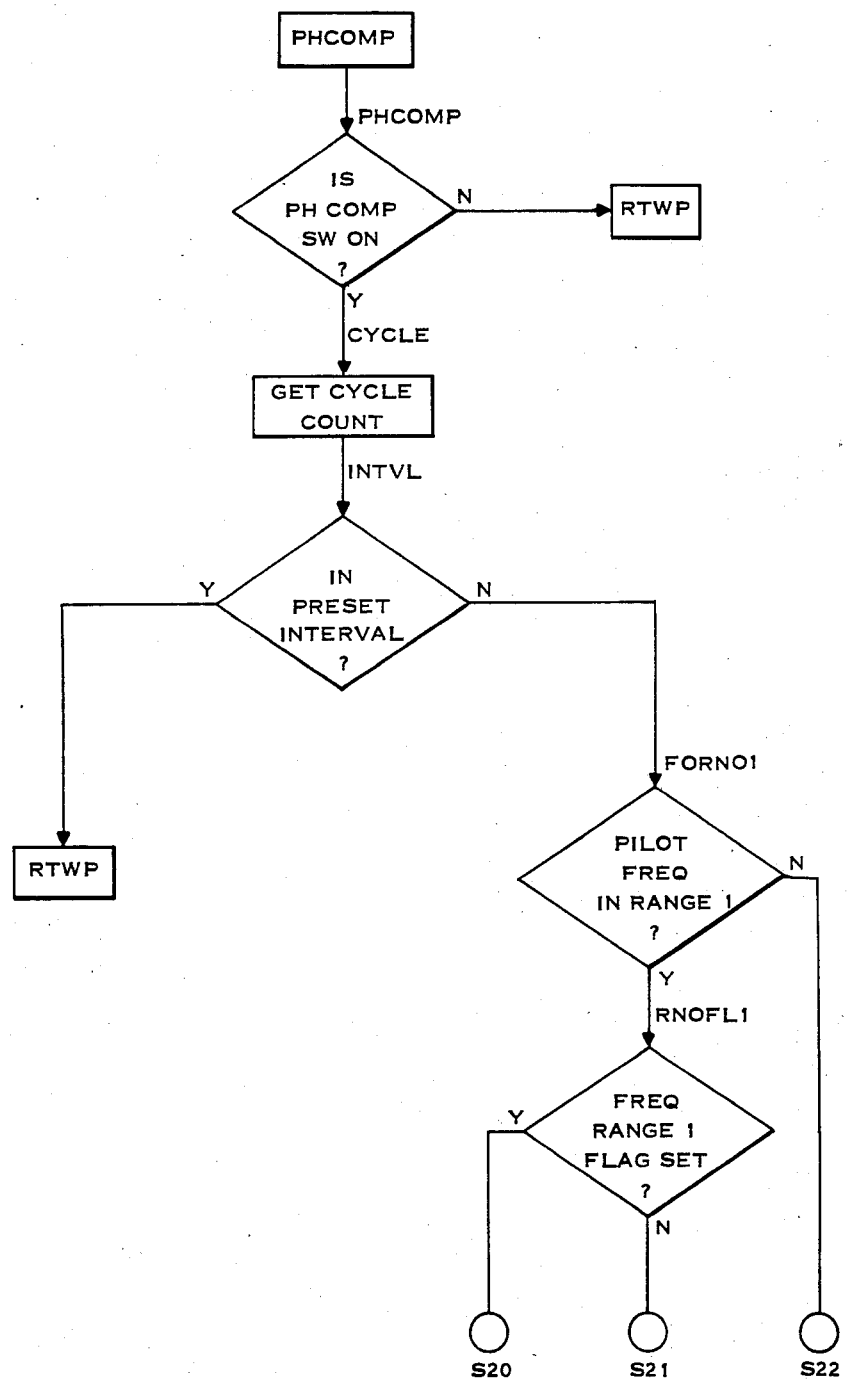
FIGS. 16a–16c form a flow chart describing the digital phase compensation.
Figure 16B:
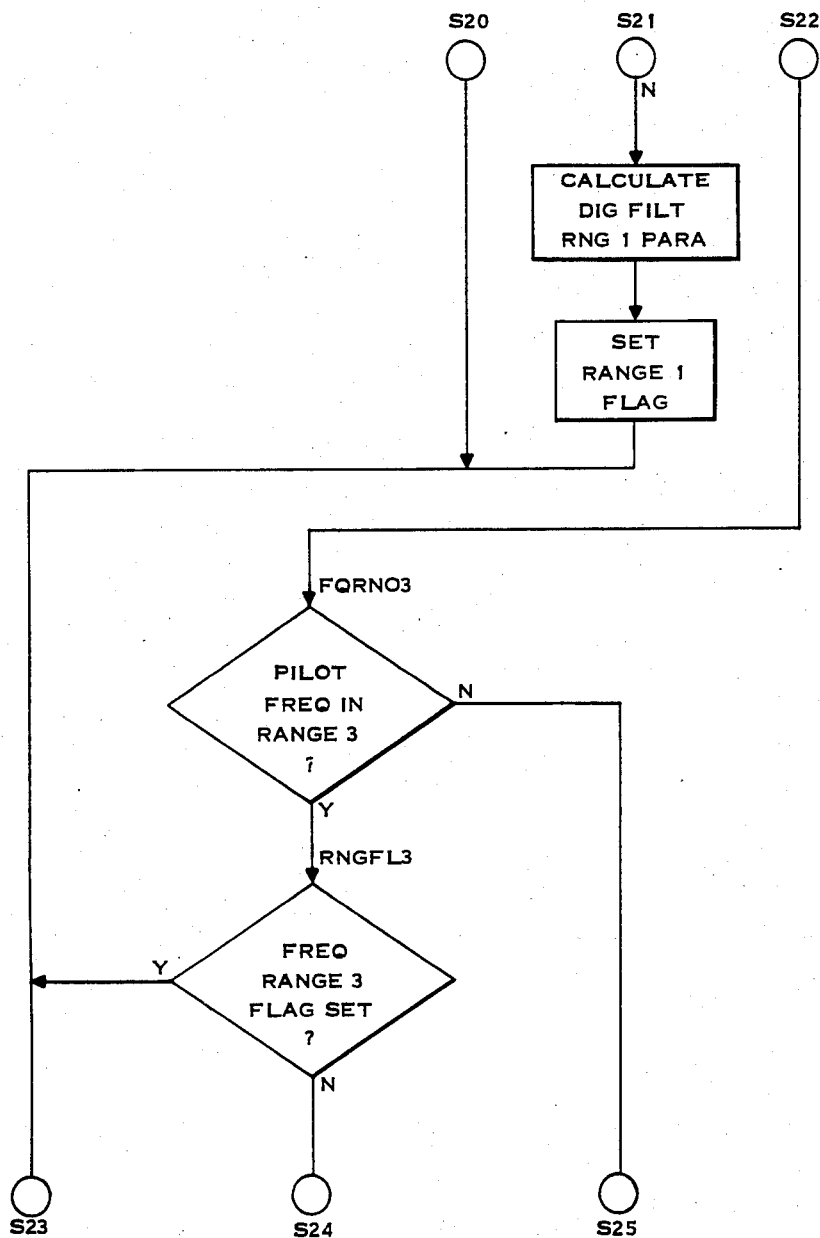
Figure 16C:
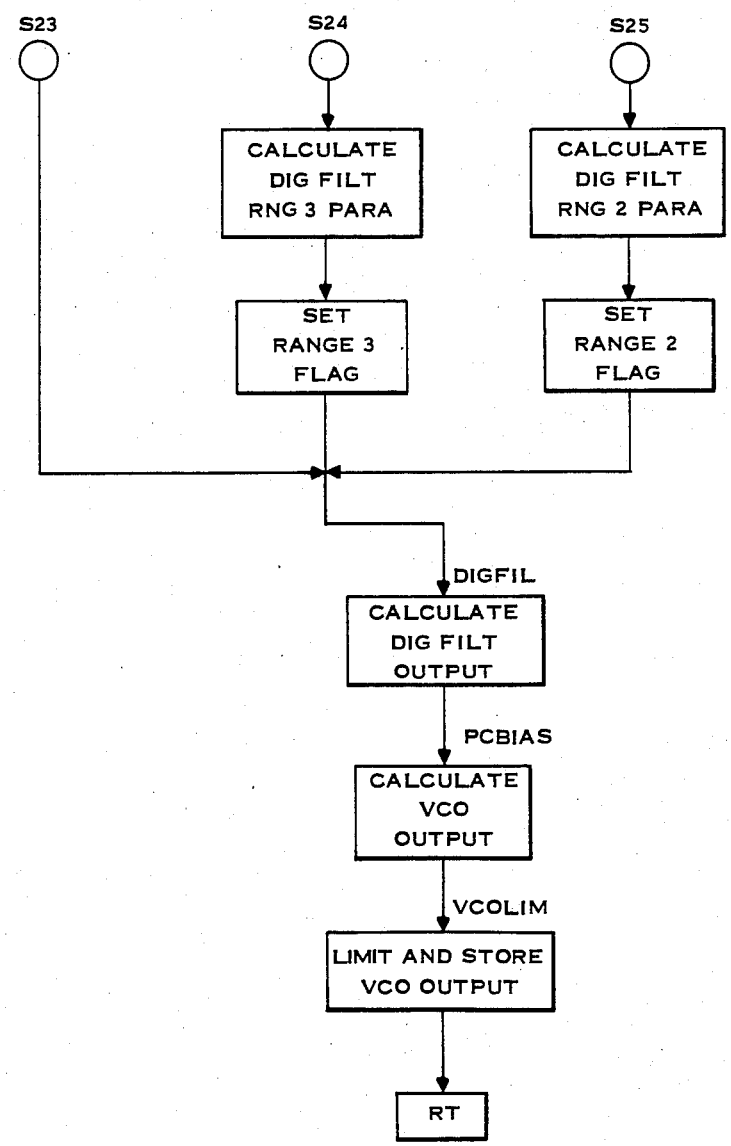

FIGS. 16a–16c from a flowchart illustrating control of the phase compensation performed in phase compensator 81 of FIG. 2. It should be noted that the details of the decision blocks of the flowchart on FIG. 16a–16c are shown in the program listing of Table II. For minute detail of these blocks, please refer to Table II.

On FIG. 16a, the question "Is phase compensation switch on?" is asked. If the answer is no, there will be no phase compensation. If the answer is yes, the circle count is obtained and it is determined whether this is within the preset interval. If the answer is yes, a routine is exited. If the answer is no, it is determined whether the pilot frequency is in range 1. If the answer is yes, it is determined whether the frequency range 1 flag is set. If the answer is yes, then the routine shown in FIG. 16b is skipped and an entry is made to the block that refers to calculate digital filter output.

If the answer was no with respect to when the pilot frequency was in range 1, then a decision is made whether the pilot frequency is in range 3. If it was determined that the frequency range 1 flag was set, then the digital filter for range 1 is calculated and the range 1 flag is set.

If the pilot frequency is in range 3, then it is determined whether the frequency range 3 flag is set. If the pilot frequency is not in range 3, then the digital filter for range 2 is calculated and the range 2 flag is set. If the frequency range 3 flag is not set, then the digital filter for range 3 is set and the range 3 flag is set. For all active cases then, the next step is to calculate the digital filter output and then to calculate the VCO output (see FIG. 14). Next, the VCO output is limited and stored and the routine is exited.

In this manner, the phase compensation is accomplished.

The component types shown in this preferred embodiment and the particular circuit or filter configurations are not to be construed as limiting. It is understood that those skilled in the art are capable of changing configurations and timing and it is intended that this specific implementation not be limiting, but that the invention be limited only by the appended claims.

What is claimed is:

1. A vibrator seismic source comprising:
   (a) a pad for imparting elastic waves to the underlying ground;
   (b) hydraulic system means for applying reciprocating forces to the pad;
   (c) sensor means for providing a feedback signal representative of the force applied to the ground;
   (d) means for generating a pilot signal representative of the desired force to be applied to the ground;
   (e) means for generating an oscillator signal;
   (f) single sideband shifting means connected to receive the feedback, pilot and oscillator signals for providing a high frequency feedback signal of a frequency equal to the sum of the frequencies of the feedback plus oscillator signals, and a high frequency pilot signal of a frequency equal to the sum of the frequencies of the pilot and oscillator signals;
   (g) phase detector means for receiving the high frequency feedback and pilot signals, for detecting the phase difference therebetween; and
   (h) means for generating a control signal for controlling the action of the hydraulic system means, responsive to the phase difference for adjusting the phase of the feedback signal to correspond with that of the pilot signal.

2. The seismic source of claim 1 wherein the means for generating the oscillator signal includes means for generating a first and a second oscillator signal, 90 degrees out of phase and wherein the single sideband shifting means comprises:
   (f)
   (i) phase difference means for providing first and second signals 90 degrees out of phase for each of the feedback and pilot signals;
   (ii) heterodyning means for adding the first and second oscillator signals to the first and second of the feedback and pilot signals, respectively, to provide high frequency first and second feedback and pilot signals; and
   (iii) summing means for summing the first and second high frequency feedback and pilot signals, respectively, to provide single sideband high frequency feedback and pilot signals.

3. The seismic source of claim 2 wherein the phase difference means comprises an all-pass filter to provide the first signal and an all-pass filter to provide the second signal for each of the feedback and pilot signals.

4. The seismic source of claim 3 wherein the heterodyning means comprises a multiplier circuit for multiplying the first and second oscillator signals by first and second feedback and pilot signals, respectively.

5. The seismic source of claim 4 further comprising limiter means for squaring the high frequency feedback and pilot signals.

6. A vibrator seismic source comprising:
 (a) a pad for imparting elastic waves to the underlying ground;
 (b) hydraulic system means for applying reciprocating forces to the pad;
 (c) sensor means for providing a feedback signal representative of the force applied to the ground;
 (d) means for generating a pilot signal representative of the desired force to be applied to the ground;
 (e) A/D converter means for continuously converting the feedback and pilot signals into digital representations thereof;
 (f) digital computing means connected to receive the digital representations of the feedback and pilot signals for providing a pair of signals 90 degrees out of phase for each of the feedback and pilot signals;
 (g) digital phase detector means connected to receive the 90 degree out of phase pairs of signals, including digital means for calculating the phase of the feedback and pilot signals and the difference therebetween; and
 (h) means for generating a control signal for controlling the action of the hydraulic system means, responsive to the phase difference for adjusting the phase of the feedback signal to correspond with that of the pilot signal.

7. A phase control system for a vibrator seismic source for applying a reciprocating force to the underlying ground comprising:
 (a) sensor means for providing a feedback signal representative of the force applied to the ground;
 (b) means for generating a pilot signal representative of the desired force to be applied to the ground;
 (c) means for generating an oscillator signal;
 (d) single sideband shifting means connected to receive the feedback, pilot and oscillator signals for providing a high frequency feedback signal of a frequency equal to the sum of the frequencies of the feedback plus oscillator signals, and a high frequency pilot signal of a frequency equal to the sum of the frequencies of the pilot and oscillator signals;
 (e) phase detector means for receiving the high frequency feedback and pilot signals for detecting the phase difference therebetween; and
 (f) means for generating a control signal for controlling the action of the seismic source, responsive to the phase difference for adjusting the phase of the feedback signal to correspond with that of the pilot signal.

8. The system of claim 7 wherein the means for generating the oscillator signal includes means for generating a second oscillator signal, 90 degrees out of phase, and wherein the single sideband shifting means comprises:
 (d)
  (i) phase difference means for providing first and second signals, 90 degrees out of phase for each of the feedback and pilot signals;
  (ii) heterodyning means for adding the first and second oscillator signals to the first and second feedback and pilot signals, respectively, to provide high frequency first and second feedback and pilot signals; and
  (iii) summing means for summing the first and second high frequency feedback and pilot signals, respectively, to provide single sideband high frequency feedback and pilot signals.

9. The system of claim 8 wherein the phase difference means comprises an all-pass filter to provide the first signal and an all-pass filter to provide the second signal for each of the feedback and pilot signals.

10. The system of claim 9 wherein the heterodyning means comprises a multiplier circuit for the multiplying the first and second oscillator signals by the first and second feedback and pilot signals, respectively.

11. The system of claim 10 further comprising limiter means for squaring the high frequency feedback and pilot signals.

12. A phase control system for a vibratory seismic source for applying a reciprocating force to the underlying ground, comprising:
 (a) sensor means for providing a feedback signal representative of the force applied to the ground;
 (b) means for generating a pilot signal representative of the desired force to be applied to the ground;
 (c) A/D converter means for continuously converting the feedback and pilot signals into digital representations thereof;
 (d) digital filter means connected to receive the digital representations of the feedback and digital signals for providing a pair of signals 90 degrees out of phase for each of the feedback and pilot signals;
 (e) digital computing means including digital phase detector means connected to receive the 90 degree out of phase pairs of signals and means for calculating the phase of the feedback and pilot signals and the difference therebetween; and
 (f) means for generating a control signal for controlling the action of the seismic source, responsive to the phase difference for adjusting the phase of the feedback signal to correspond with that of the pilot signal.

13. A method of controlling the operation of a vibratory seismic source for imparting reciprocating forces to the underlying ground comprising the steps of:
 (a) providing a feedback signal representative of the ground force;
 (b) providing a pilot signal of the desired ground force;
 (c) providing an oscillator signal;
 (d) generating augmented feedback and augmented pilot signals by adding the oscillator signal to each of the feedback and pilot signals;
 (e) detecting the difference in phase between the augmented feedback and pilot signals; and
 (f) generating a control signal, adjusted by the difference in phase, to cause the feedback signal to be in phase with the pilot signal.

14. A method of controlling the operation of a vibratory seismic source for imparting reciprocating forces to the underlying ground, comprising the steps of:
 (a) providing a feedback signal representative of the ground force;

(b) providing a pilot signal representative of the desired ground force;
(c) digitizing the feedback and pilot signal;
(d) generating a second signal 90 degrees out of phase for each of the digitized feedback and pilot signals;
(e) calculating the phase of the feedback and pilot signals, respectively, from each signal and its second signal, 90 degrees out of phase;
(f) calculating the difference in phase between the feedback and pilot phases; and
(g) generating a control signal, adjusted by the difference in phase, to correspond in phase to the pilot signal.

* * * * *